United States Patent
Hinman

(10) Patent No.: US 11,952,110 B1
(45) Date of Patent: Apr. 9, 2024

(54) ELECTRIC ROTORCRAFT CYCLIC CONTROL SYSTEM

(71) Applicant: SiFly Aviation, Inc., Carmel Valley, CA (US)

(72) Inventor: Brian L. Hinman, Carmel Valley, CA (US)

(73) Assignee: SiFly Aviation, Inc., Santa Clara, CA (US)

( * ) Notice: Subject to any disclaimer, the term of this patent is extended or adjusted under 35 U.S.C. 154(b) by 0 days.

(21) Appl. No.: 17/893,540

(22) Filed: Aug. 23, 2022

Related U.S. Application Data

(60) Provisional application No. 63/240,209, filed on Sep. 2, 2021, provisional application No. 63/236,987, filed on Aug. 25, 2021, provisional application No. 63/236,448, filed on Aug. 24, 2021.

(51) Int. Cl.
*B64C 27/68* (2006.01)

(52) U.S. Cl.
CPC .................................. *B64C 27/68* (2013.01)

(58) Field of Classification Search
CPC ......... B64C 27/68; B64C 27/12; B64C 11/48; B64C 27/08; B64C 27/14; B64C 27/605; B64C 27/72; B64C 29/0033; B64U 30/20; B64U 10/10; B64U 50/13; B64U 50/19; B64U 10/13
See application file for complete search history.

(56) References Cited

U.S. PATENT DOCUMENTS

| | | | |
|---|---|---|---|
| 1,994,488 A | 6/1931 | Sikorsky | |
| 4,153,390 A * | 5/1979 | Weiland | B64C 27/33 416/138 |
| 4,541,777 A * | 9/1985 | Sampatacos | B64C 27/33 416/138 |
| 5,110,314 A | 5/1992 | Fujihara et al. | |
| 5,259,729 A | 11/1993 | Fujihira et al. | |
| 8,201,771 B2 | 6/2012 | Kessler | |
| 9,914,535 B2 | 3/2018 | Paulos | |
| 10,759,525 B2 | 9/2020 | Brunner | |
| 10,843,790 B2 * | 11/2020 | Vander Lind | B64C 11/18 |
| 2005/0226727 A1 * | 10/2005 | Dennis | B64C 11/44 416/98 |

(Continued)

OTHER PUBLICATIONS

Wang, et al., CSSA journal paper, "Development of swashplateless helicopter blade pitch control system using the limited angle direct-drive motor (LADDM)," Aug. 2015.

*Primary Examiner* — Medhat Badawi
*Assistant Examiner* — Vicente Rodriguez
(74) *Attorney, Agent, or Firm* — Sunstein LLP

(57) ABSTRACT

An improved electrically powered rotorcraft is of the type having a rotor including a rotor hub and a pair of rotor blades mounted to the rotor hub on opposite sides thereof, the rotor being rotatably mounted on a primary drive shaft, and a rotary electric motor coupled to the drive shaft. In this rotorcraft, the improvement includes a common pitch-angle shaft coupled to each of the blades; a limited-angle electric motor, mechanically coupled to the common pitch-angle shaft, and configured to cause rotation of the common pitch angle shaft and therefore adjustment of pitch of the pair of rotor blades; and a controller system in communication with the limited-angle electric motor, configured to provide cyclic control of pitch of the pair of rotor blades.

17 Claims, 26 Drawing Sheets

(56) References Cited

U.S. PATENT DOCUMENTS

| | | | | |
|---|---|---|---|---|
| 2010/0025526 | A1* | 2/2010 | Lawrence | B64C 39/024 |
| | | | | 244/17.23 |
| 2010/0329866 | A1* | 12/2010 | Hunt | B63B 21/50 |
| | | | | 416/159 |
| 2012/0318397 | A1* | 12/2012 | Rousseau | H02G 3/0468 |
| | | | | 264/165 |
| 2012/0321472 | A1* | 12/2012 | Davis | A63H 27/12 |
| | | | | 416/147 |
| 2017/0174337 | A1* | 6/2017 | Roberts | B64C 11/18 |
| 2017/0274991 | A1* | 9/2017 | Shiosaki | B64C 27/14 |
| 2020/0333779 | A1* | 10/2020 | Regev | B64C 39/08 |
| 2021/0147076 | A1* | 5/2021 | Stearns | B64C 27/10 |

\* cited by examiner

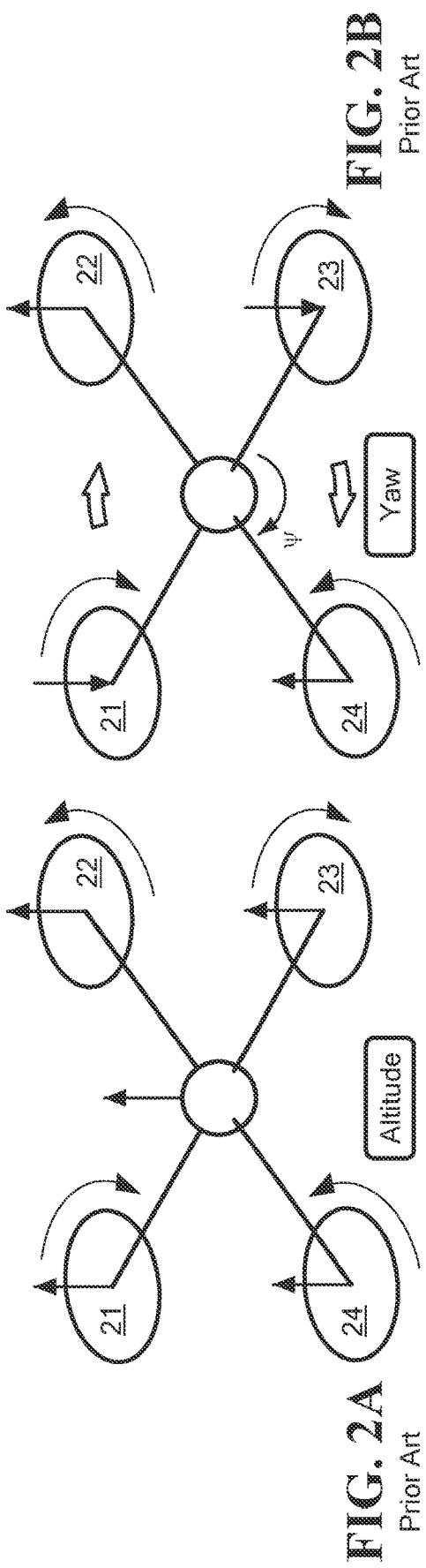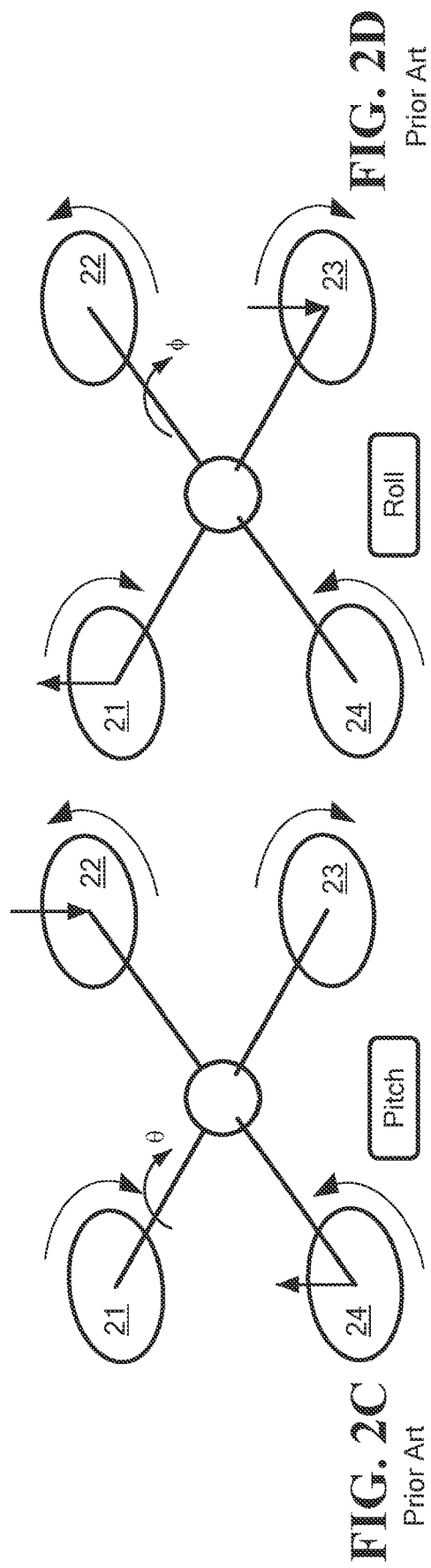

Airfoil: VR-12
Re: 200k

| Alpha | Cm1 | Alpha 2 | Cm2 | Cm1 - Cm2 |
|---|---|---|---|---|
| 14.0 | 0.0250 | 0.0 | -0.0390 | 0.0640 |
| 13.0 | 0.0177 | 1.0 | -0.0336 | 0.0513 |
| 12.0 | 0.0083 | 2.0 | -0.0294 | 0.0377 |
| 11.0 | 0.0010 | 3.0 | -0.0258 | 0.0268 |
| 10.0 | -0.0038 | 4.0 | -0.0231 | 0.0193 |
| 9.0 | -0.0076 | 5.0 | -0.0202 | 0.0126 |
| 8.0 | -0.0108 | 6.0 | -0.0171 | 0.0063 |
| 7.0 | -0.0141 | 7.0 | -0.0141 | 0.0000 |
| 6.0 | -0.0171 | 8.0 | -0.0108 | -0.0063 |
| 5.0 | -0.0202 | 9.0 | -0.0076 | -0.0126 |
| 4.0 | -0.0231 | 10.0 | -0.0038 | -0.0193 |
| 3.0 | -0.0258 | 11.0 | 0.0010 | -0.0268 |
| 2.0 | -0.0294 | 12.0 | 0.0083 | -0.0377 |
| 1.0 | -0.0336 | 13.0 | 0.0177 | -0.0513 |
| 0.0 | -0.0390 | 14.0 | 0.0250 | -0.0640 |

To FIG. 8 Continued

Airfoil: VR-7
Re: 200k

| Alpha | Cm1 | Alpha 2 | Cm2 | Cm1 - Cm2 |
|---|---|---|---|---|
| 14.0 | 0.0059 | 0.0 | -0.0608 | 0.0667 |
| 13.0 | 0.0035 | 1.0 | -0.0630 | 0.0665 |
| 12.0 | 0.0001 | 2.0 | -0.0590 | 0.0591 |
| 11.0 | -0.0047 | 3.0 | -0.0550 | 0.0503 |
| 10.0 | -0.0145 | 4.0 | -0.0522 | 0.0377 |
| 9.0 | -0.0281 | 5.0 | -0.0488 | 0.0207 |
| 8.0 | -0.0362 | 6.0 | -0.0453 | 0.0091 |
| 7.0 | -0.0412 | 7.0 | -0.0412 | 0.0000 |
| 6.0 | -0.0453 | 8.0 | -0.0362 | -0.0091 |
| 5.0 | -0.0488 | 9.0 | -0.0281 | -0.0207 |
| 4.0 | -0.0522 | 10.0 | -0.0145 | -0.0377 |
| 3.0 | -0.0550 | 11.0 | -0.0047 | -0.0503 |
| 2.0 | -0.0590 | 12.0 | 0.0001 | -0.0591 |
| 1.0 | -0.0630 | 13.0 | 0.0035 | -0.0665 |
| 0.0 | -0.0608 | 14.0 | 0.0059 | -0.0667 |

From FIG. 8

Airfoil: NACA0012
Re: 200k

| Alpha | Cm1 | Alpha 2 | Cm2 | Cm1 - Cm2 |
|---|---|---|---|---|
| 14.0 | 0.0275 | 0.0 | 0.0000 | 0.0275 |
| 13.0 | 0.0372 | 1.0 | -0.0033 | 0.0405 |
| 12.0 | 0.0286 | 2.0 | -0.0122 | 0.0408 |
| 11.0 | 0.0222 | 3.0 | -0.0180 | 0.0402 |
| 10.0 | 0.0168 | 4.0 | -0.0145 | 0.0313 |
| 9.0 | 0.0124 | 5.0 | -0.0099 | 0.0223 |
| 8.0 | 0.0077 | 6.0 | -0.0043 | 0.0120 |
| 7.0 | 0.0018 | 7.0 | 0.0018 | 0.0000 |
| 6.0 | -0.0043 | 8.0 | 0.0077 | -0.0120 |
| 5.0 | -0.0099 | 9.0 | 0.0124 | -0.0223 |
| 4.0 | -0.0145 | 10.0 | 0.0168 | -0.0313 |
| 3.0 | -0.0180 | 11.0 | 0.0222 | -0.0402 |
| 2.0 | -0.0122 | 12.0 | 0.0286 | -0.0408 |
| 1.0 | -0.0033 | 13.0 | 0.0372 | -0.0405 |
| 0.0 | 0.0000 | 14.0 | 0.0275 | -0.0275 |

From FIG. 8

Airfoil: FX63-137
Re: 200k

| Alpha | Cm1 | Alpha 2 | Cm2 | Cm1 - Cm2 |
|---|---|---|---|---|
| 14.0 | -0.1286 | 0.0 | -0.2018 | 0.0732 |
| 13.0 | -0.1302 | 1.0 | -0.2008 | 0.0706 |
| 12.0 | -0.1336 | 2.0 | -0.1997 | 0.0661 |
| 11.0 | -0.1406 | 3.0 | -0.1978 | 0.0572 |
| 10.0 | -0.1512 | 4.0 | -0.1949 | 0.0437 |
| 9.0 | -0.1630 | 5.0 | -0.1915 | 0.0285 |
| 8.0 | -0.1735 | 6.0 | -0.1839 | 0.0104 |
| 7.0 | -0.1810 | 7.0 | -0.1810 | 0.0000 |
| 6.0 | -0.1839 | 8.0 | -0.1735 | -0.0104 |
| 5.0 | -0.1915 | 9.0 | -0.1630 | -0.0285 |
| 4.0 | -0.1949 | 10.0 | -0.1512 | -0.0437 |
| 3.0 | -0.1978 | 11.0 | -0.1406 | -0.0572 |
| 2.0 | -0.1997 | 12.0 | -0.1336 | -0.0661 |
| 1.0 | -0.2008 | 13.0 | -0.1302 | -0.0706 |
| 0.0 | -0.2018 | 14.0 | -0.1286 | -0.0732 |

FIG. 8 Continued

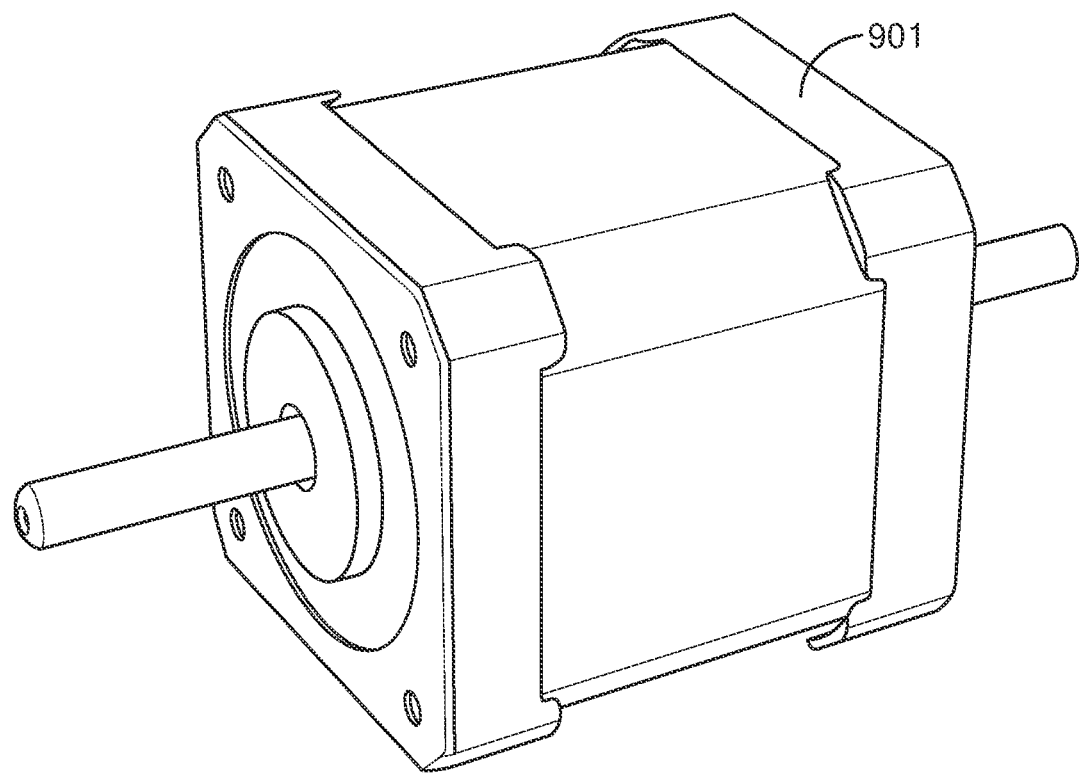
FIG. 9A
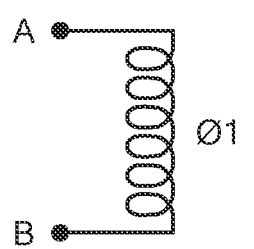
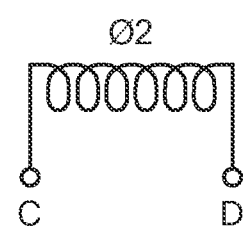
FIG. 9B

ELECTRIC ROTORCRAFT CYCLIC CONTROL SYSTEM

RELATED APPLICATIONS

The present application claims the benefit of provisional applications Ser. No. 63/236,448, filed Aug. 24, 2021, Ser. No. 63/236,987, filed Aug. 25, 2021, and Ser. No. 63/240,209, filed Sep. 2, 2021. Each of these related applications is hereby incorporated herein by reference in its entirety.

TECHNICAL FIELD

The technical field generally relates to rotorcraft design, and more specifically relates to a means to achieve cyclic control of an electrically propelled rotorcraft.

BACKGROUND ART

The classic helicopter design perfected by Igor Sikorsky in the 1930s, described in U.S. Pat. No. 1,994,488, has a main rotor to provide lift and a tail rotor to counteract the drag-induced torque of the main rotor. The main rotor in a classic helicopter generally operates at a constant rotational speed, whereby thrust is varied by increasing or decreasing the overall pitch angle of the rotor blades, and a shifting of the integrated center of thrust is accomplished by varying the pitch angle of each blade as a function of the angular position in rotation. The magnitude of the integrated thrust, referred to as "collective," is controlled with a handle operated by the pilot's left hand, while the variation in the integrated thrust center, referred to as "cyclic," is controlled by a stick operated by the pilot's right hand. The tail rotor in a classic helicopter is typically driven from a shaft connected to the transmission for the main rotor, and it typically operates at a constant rpm. The magnitude of anti-torque thrust generated by the tail rotor is adjusted by varying the pitch of the tail rotor blades, which is controlled by the interconnected right and left pedals operated by the pilot's feet.

In the classic helicopter design, the application of main rotor collective and cyclic controls is achieved with a mechanism called a "swashplate." As illustrated in FIG. 1A and FIG. 1B, (which is a close-up view of dashed area 1 of FIG. 1A), the swashplate has two circular rings 11, 12 interconnected with bearings, whereby the upper ring 11 rotates with the rotor head, and the lower ring 12 remains stationary, supported by control rods 13. The upper ring 11 has pitch linkages 14 attached to a pivot 15 on each rotor blade 16, articulating the pitch of the blade as the linkages ride higher or lower on the swashplate. By raising and lowering the overall swashplate, collective control is achieved, while tilting the swashplate facilitates cyclic control.

In the 1930s, in the absence of computer systems, the pilot would train his or her brain to control a classic helicopter. Minor perturbations of the airflow around the helicopter require constant small adjustments to the cyclic, collective and pedal controls, bringing stability to an aircraft that is not inherently stable. Despite the advancement of computer systems over the past 50 years, the Sikorsky conceived helicopter remains the dominant design of helicopters which carry humans, and the pilot continues to play the critical role of stabilizing the aircraft. Other rotorcraft configurations have been developed with varying degrees of military and commercial success, including helicopters with coaxial rotors, tandem rotors, side-by-side rotors, and intermeshed rotors. Almost all human-carrying helicopters have in common the swashplate for cyclic control, and almost all rely upon the pilot for aircraft stabilization.

Since 2010, the world has seen the proliferation of drones, particularly unmanned quad-copters used for commercial and consumer purposes. While the quad-copter configuration, first introduced by Etienne Omnichen in 1920, actually predates the Sikorsky design, it remained a footnote in aviation history until electronics reached a point of being able to control the quad-copter. FIGS. 2A, 2B, 2C, and 2D, illustrate control methods for a quad-copter. Unlike a classic helicopter, the quad-copter is controlled through variation of rotor rpm, holding the rotor blade pitch constant throughout rotation. Two of the rotors 21, 23, oriented on opposite sides of the center of gravity, rotate clockwise, while the other two rotors 22, 24 rotate counter-clockwise. As shown in FIG. 2A, increasing or decreasing the rpm of all four rotors 21, 22, 23, 24, in unison achieves the equivalent of collective (altitude) control. As shown in FIG. 2B, a differential in rpm between rotor pair 21, 23, and rotor pair 22, 24 (such pairs having opposite directions of rotation) causes an imbalance in the drag induced torque acting upon the aircraft, achieving yaw control. In FIG. 2C, holding the rpm of rotors 21, 23, constant, while increasing the rpm of rotor 24 and decreasing the rpm of rotor 22, achieves pitch control. Lastly, as shown in FIG. 2D, holding the rpm of rotors 22, 24, constant, while increasing the rpm of rotor 21 and decreasing the rpm of rotor 23, achieves roll control. Combinations of these four control methods allows the aircraft to achieve a desired position in three-space, as well as a desired azimuthal heading. The now ubiquitous quad-copter drone was realized through the availability of electric motors, low-power computers, inertial sensors and lithium-ion batteries. High volume manufacturing has driven the cost of quad-copters so low that they have become popular toys for children.

Over the last ten years, the number of companies developing electrically-powered vertical take-off and landing (eVTOL) aircraft has grown exponentially. Motivated by the opportunity to save time through urban air mobility, more than 200 commercial and research organizations have eVTOL aircraft under development today. The designs are highly varied, though most fall into three popular categories: multi-copter, tilt-rotor, and lift+cruise configurations. Interestingly, very few eVTOLs resemble either the classic helicopter or the drone quad-copter, even though such developments occupy the longest span of time in helicopter design. The complexity of eVTOL designs is often high, particularly tilt-rotor configurations with a large number of rotors, each rotor having collective control, articulation of the rotors for cruise flight, and control surfaces like traditional airplanes.

While the cruise speed and efficiency of such aircraft will be superior to classic helicopters or quad-copters, these improvement come with a high cost and increased reliability considerations. Moreover, for missions involving extensive hovering, tilt-rotor designs are often inferior in power efficiency, because disk loading is typically higher than used for traditional helicopters.

Recognizing the cost and reliability implications of high complexity, there are some researchers exploring technologies to simplify the design of unmanned aerial vehicles (UAVs) and eVTOLs. Reducing the number of rotors, reducing the complexity of articulations within each rotor, and eliminating control surfaces, are all steps toward lower cost and improved reliability. Leveraging the unique characteristics of electric motors provides the avenue for innovation in this regard.

One unique characteristic of electric motors is the ability to adjust the rotational speed very rapidly. In fact, the electric motor can undergo angular acceleration and deceleration over the course of a single rotation, in a manner wherein the time to complete a single rotation may be held constant, while the angular velocity at one position in rotation can be much greater than the angular velocity half a rotation later. When a gear-reduction mechanism is introduced between the electric motor and the rotor, the periodicity of angular acceleration and deceleration is reduced so as to achieve synchronization with respect to a single rotation of the propeller or rotor. A motor control circuit orchestrates such operation with input from a sensor that informs the rotational position of the propeller or rotor. The ability to accelerate and decelerate the electric motor has been exploited for control benefits, by causing the thrust center to move preferentially toward a position where angular velocity is highest.

The first description of controlling an aircraft by exploiting angular acceleration and deceleration of an electric motor, within a single revolution of the propeller or rotor, was by Fujihara et al in U.S. Pat. No. 5,110,314, issued in 1992. They describe an asymmetric propeller, with counterweights to balance inertial momentum, in which the propeller tip path is inclined by an electrical control "to achieve accurate drivability." The electrical control there utilizes a position sensor, to detect the angular position of the propeller, and a motor drive circuit to create acceleration and deceleration synchronously with the angular position.

Fujihara et al refined their drive concepts in U.S. Pat. No. 5,259,729 in 1993, describing how the rotor can be physically symmetric, with blades on both sides of the hub, though controlling the blades in an asymmetric fashion. One of the two plastic blades in the helicopter rotor is connected to a central rotating hub through a flexible linkage. Upon angular acceleration, the flexible linkage causes inclination of the connected blade, increasing its coefficient of lift. By timing the angular acceleration with the desired angular position of the inclined rotor blade, a successful control system was developed. The Fujihara et al innovations were embodied in the Keyence Revolutor H-610, the world's first micro remotely controlled helicopter.

Paulos at Penn State developed a similar helicopter control system that varies the angular velocity of an electric motor to adjust the blade pitch in an asymmetric fashion. The key innovation described by Paulos is a rotor head with dissimilar hinge mechanisms for each of the two rotor blades, as illustrated in FIGS. 3A and 3B. The rotor head shown in FIGS. 3A and 3B include a lag pitch hinge 32, flap hinge 33, hub 34, cross 35 and blade grip 36. Under constant angular velocity, the two rotor blades 31 have approximately the same incidence angle. Upon angular acceleration, the rotor head causes one blade to increase in incidence angle, while the other blade decreases in incidence angle. As with the Fujihara invention, an angular position sensor allows a successful means of helicopter control. Paulos received U.S. Pat. No. 9,914,535 in 2018. While intended for "micro air vehicles," the design was later proven in a larger model helicopter.

Most recently, Brunner describes a "drive system for a vehicle" in U.S. Pat. No. 10,759,525 issued in 2020. The drive system has a rotor with at least one blade, a counterweight on the opposite side, and uses acceleration and braking phases to shift the thrust vector from the center of the rotor to an offset position determined by the control system. As with the Fujihara and Paulos patents, Brunner uses angular position to time the acceleration and braking phases. Brunner describes embodiments for both vertical take-off and landing aircraft, as well as conventional take-off and landing aircraft.

An inherent problem with rotor cyclic control methods that rely upon rapid acceleration and deceleration of the rotor is the large variation in electric current through the motor. While electric motors can operate with almost constant torque from low rpm until power limited at high rpm, they are not necessarily efficient over this range. Indeed, the highest efficiency for brushless DC motors usually occurs at the upper region of rpm, where the motor is limited by the maximum power, and hence with torque reduced. Varying the operating conditions of the motor away from the optimal rpm and torque, as required to rapidly increase and decrease the rotational energy, results in heat loss and hence reduced efficiency. To this point, Stanton, an experimenter who replicated the work of Paulos at Penn State, reported excessive heating in the motor of his electric helicopter prototype.

Instead of rapidly adjusting rotor angular velocity, other researchers have explored rotor control methods that are the electrical equivalent of a mechanical swashplate, modifying the pitch angle of the blades as a function of rotor angular position. Some of these methods involve electrical actuators in the fixed frame of reference, acting upon a swashplate, in lieu of the mechanical push rods that normally serve this role. Kessler and Furst were issued U.S. Pat. No. 8,201,771 in 2012 for helicopter rotor control, with a scheme of tilting a swashplate with electrical actuators. Arnold et al published a paper in 2013, in which he describes three electrical actuators articulating a rotor swashplate.

More recently, researchers have explored methods of directly adjusting the pitch of the rotor blades, within the rotating frame of reference. Wang et al. CSSA journal paper, "Development of swashplateless helicopter blade pitch control system using the limited angle direct-drive motor (LADDM)," August 2015. describes the use of Limited Angle Direct Drive Motors (LADDM), more commonly referred to as Limited Angle Torque (LAT) motors, for the direct articulation of individual rotor blades. As illustrated in FIGS. 4A, 4B, 4C, and 4D, Wang et al. modeled and prototyped a three-bladed rotor with a diameter of 4 meters, demonstrating that the concept can work for full-scale helicopters. Signals and power were conveyed from the fixed frame to the rotating frame with the use of multichannel slip rings.

SUMMARY OF THE EMBODIMENTS

The present invention provides an improved electrically powered rotorcraft, of the type having a rotor including a rotor hub and a pair of rotor blades mounted to the rotor hub on opposite sides thereof, the rotor being rotatably mounted on a primary drive shaft, and a rotary electric motor coupled to the drive shaft. In this embodiment, the improvement comprises:

a common pitch-angle shaft coupled to each of the blades;
a limited-angle electric motor, mechanically coupled to the common pitch-angle shaft, and configured to cause rotation of the common pitch angle shaft and therefore adjustment of pitch of the pair of rotor blades; and
a controller system in communication with the limited-angle electric motor, configured to provide cyclic control of pitch of the pair of rotor blades. Optionally, the improvement further comprises a drive shaft rotary encoder, coupled to the primary drive shaft, having an output indicative of an angular position of the rotor over its 360-degree sweep, the output coupled to the controller system to inform the controller system of the current position of the rotor in the course of its 360-degree sweep. As a further option, the improvement further comprises a cyclic pitch rotary encoder, coupled to the common pitch-angle shaft, having an output indicative the common pitch angle, the output coupled to the controller system to inform the controller system of the current common pitch angle of the pair of rotor blades. Alternatively, the improvement further comprises configuration of the cyclic pitch rotary encoder and the controller system to provide absolute angular positioning of the common pitch angle of the pair of rotor blades. Alternatively, the improvement further comprises configuration of the cyclic pitch rotary encoder and the controller system to provide incremental angular positioning of the common pitch angle of the pair of rotor blades.

Also optionally, the improvement further comprises a set of physical stops configured to limit rotation of the common pitch angle shaft to a specified range. In another related embodiment, the improvement further comprises redundant instances, for purposes of increased reliability, of a member selected from the group consisting of the rotary electric motor, the limited-angle electric motor, the controller system, the rotary encoder, and combinations thereof. Alternatively or in addition, the improvement further comprises a plurality of pairs of rotor blades on opposite sides of the rotor hub and sharing the common pitch-angle shaft.

In a further related embodiment, the limited-angle electric motor is a stepper motor. Optionally, the improvement further comprises a gear reduction mechanism disposed between the limited-angle motor and the common pitch-angle shaft. Also optionally, the improvement further comprises a gear reduction mechanism disposed between the rotary electric motor and the primary drive shaft. Also optionally, the improvement further comprises an actuator arm coupled to the common pitch-angle shaft and a mechanical linkage disposed between the actuator arm and an eccentric coupled to the limited-angle motor output shaft, in a manner configured to provide mechanical leverage to the limited-angle motor.

In another related embodiment, the rotorcraft has a stationary frame and a rotating frame, and the improvement further comprises a rotary transformer to convey power and signals from the stationary frame to the rotating frame. Alternatively, the rotorcraft has a stationary frame and a rotating frame, and the improvement further comprises a sleeve coupling to convey power and signals from the stationary frame to the rotating frame.

Optionally, each rotor blade has a root, and the improvement further comprises a set of flapping and lead-lag hinges placed between the common pitch-angle shaft and the root of each rotor blade. As a further option, the improvement further comprises a flexible joint, between the common pitch-angle shaft and each rotor blade, configured to allow limited flapping and lead-lag motion of such rotor blade. In a related embodiment the improvement further comprises a set of hinges configured to allow each rotor blade to flap and a mechanical Delta-3 coupling of each rotor blade to the common pitch-angle shaft so that Delta-3 mechanically combines with the limited-angle electric motor shaft to offset blade pitch.

Embodiments of the present invention provide a means for cyclic rotor control through the variation of movement of a limited angle motor, driving a shaft shared by two blades on the opposite sides of the rotor center, causing the increase in pitch angle for one blade, while simultaneously causing a decrease in the pitch angle for the other blade. Referencing the angular position of the rotor, for example with a shaft encoder, a control system applies cyclic response through the limited angle motor. In this embodiment, over 360 degrees of rotor movement, the applied cyclic response is a single cycle of a sinusoid, for example, over a peak-to-peak excursion of +/−7 degrees, to emulate the cyclic response of a classic swashplate. The phase angle of the sinusoid is adjusted in accordance with the desired angle of offset thrust, while the magnitude of the sinusoid is adjusted in accordance with the desired shift in the thrust position from the nominal rotor center.

A key observation leading to embodiments of the present invention is the ability to decouple the collective and cyclic responses, provided that an electric motor drives the main rotor. Rather than increasing the overall pitch of the rotor blades while leaving rotational velocity constant, these embodiments require the main driving motor to increase angular velocity to cause a net increase in thrust. This approach reduces the number of limited angle motors required from the prior art, which uses one per blade, such as in the case of Wang et al., to one per pair of blades. Moreover, because the blades apply torque to the shared shaft in counter rotation to one another, the net required motor torque can be reduced, as compared with driving the blades individually. Unlike the case of angular acceleration and deceleration of the rotor within a single rotation, as required in the methods of Paulos and Brunner, these embodiments use the rapid movement of a low-power limited angle motor to create cyclic response. While the collective response, provided by the main rotor angular velocity variation, occurs over a much longer time scale, thus not stressing the main driving motor with rapid increases and decreases in rotational energy of the rotor system. Along the axis of the two blades sharing a common pitch-angle shaft, the rotational energy during the cyclic response remains quite low, given the narrow width of the rotor chord. Thus, the required torque and power of the limited angle motor remain low relative to the main driving motor.

BRIEF DESCRIPTION OF THE DRAWINGS

The foregoing features of embodiments will be more readily understood by reference to the following detailed description, taken with reference to the accompanying drawings, in which:

FIG. 2A is an exemplary illustration of quad-copter control dynamics to change the altitude of a rotorcraft in accordance with the prior art.

FIG. 2B is an exemplary illustration of quad-copter control dynamics to change the yaw of a rotorcraft in accordance with the prior art.

FIG. 2C is an exemplary illustration of quad-copter control dynamics to change the pitch of a rotorcraft in accordance with the prior art.

FIG. 2D is an exemplary illustration of quad-copter control dynamics to change the roll of a rotorcraft in accordance with the prior art.

FIG. 8 is a set of tables providing a comparison of exemplary airfoils and their combined pitching moment coefficient over a range of cyclic responses, in accordance with an embodiment of the present invention.

FIG. 9A is an exemplary dual-shaft NEMA14 stepper motor in accordance with the prior art.

FIG. 9B illustrates the timing diagram to achieve clockwise and counter-clockwise half-step operation for a two-phase stepper motor, in accordance with an embodiment of the present invention.

FIG. 12A is an idealized sinusoidal cyclic response, having a nominal blade incidence angle of 11 degrees, and a cyclic amplitude of +/−7 degrees, in accordance with an embodiment of the present invention.

FIG. 12B is an exemplary approximation of a sinusoidal cyclic response, realized with a stepper motor operating with half-steps of 0.9 degrees, in accordance with an embodiment of the present invention.

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

A "limited-angle electric motor" is an electric motor selected from the group consisting of a single-phase Limited Angle Torque (LAT) motor; a two-phase stepper motor, a three-phase brushless DC (BLDC) motor, and any other electric motor offering controlled angular movement over a range suitable for cyclic pitch adjustment of a set of rotor blades to which the electric motor is coupled.

FIG. 5A through FIG. 5E illustrate several views of an exemplary cyclic control mechanism, including a two-bladed rotor with a pitch angle shaft 102 articulated by a limited-angle electric motor 103 (here implemented by a stepper motor), controlled by a controller system 104, 107, in accordance with an embodiment of the present invention. In this example, the articulation of the common pitch angle shaft 102 occurs on-axis, utilizing a dual-shafted motor 103. The rotor blades 100, 101 are connected through a common shaft 102 and articulated over a limited angular range by a single cyclic motor 103 acting on the common shaft in the rotor hub. In order to minimize the torque requirements of the cyclic motor 103, the shaft is connected to the blade at the position of aerodynamic center, which is typically 25% of the chord width from the leading edge of the rotor blade. At this position, the pitching moment acting upon the blade tends to be minimized, a fact that was important from the early days of helicopter development. Symmetric airfoils are well behaved in terms of low pitching moment, as the blade is articulated over a range of angles of attack. Asymmetric airfoils offer a higher coefficient of lift than symmetric airfoils, though this comes at the expense of having a much larger variation in pitching moment. A set of compromise airfoils, balancing lift performance and pitching moment, were developed by companies such as Boeing Vertol, including the VR-7 and VR-12 airfoils. For one embodiment of the cyclic control system, the VR-12 profile was selected.

Figure 1A:
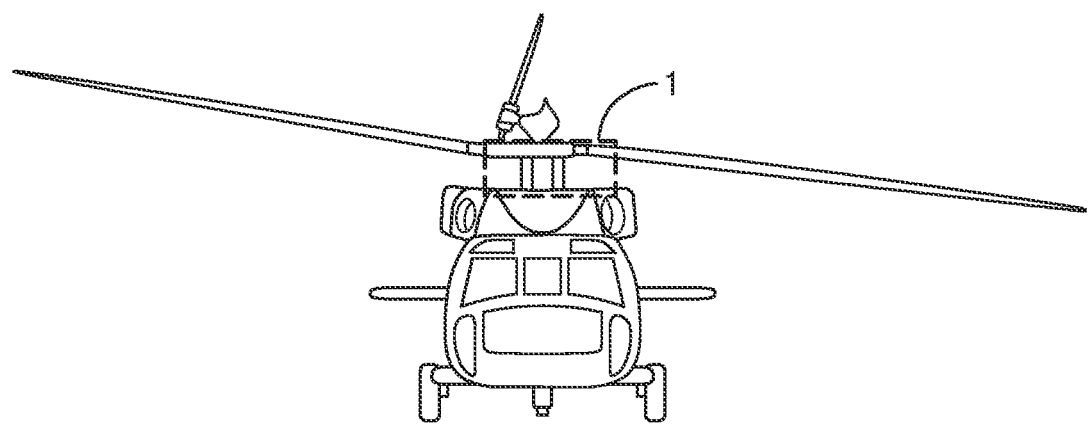
FIG. 1A is an exemplary illustration of a portion of a rotorcraft comprising traditional swashplate elements in accordance with the prior art.
Figure 1B:
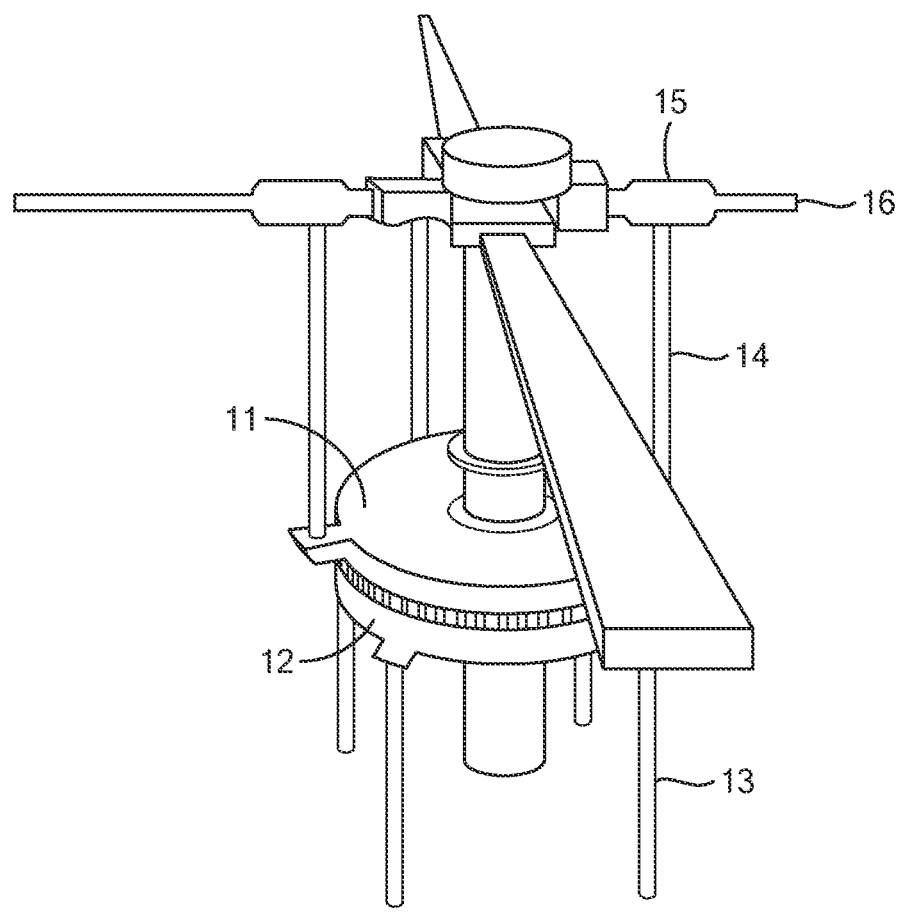
FIG. 1B is a zoomed in view of the swashplate elements of FIG. 1A.
Figure 3A:
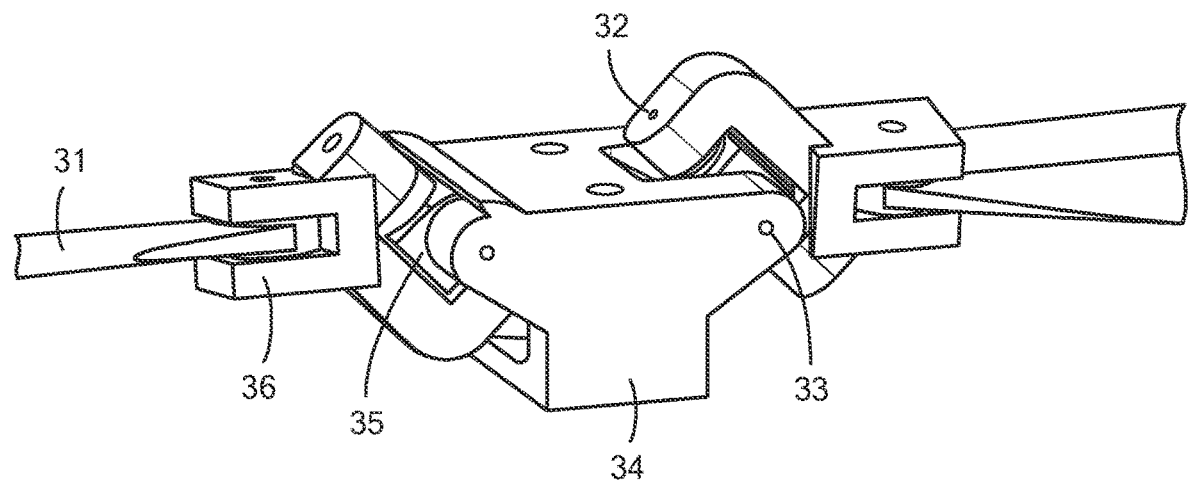
FIG. 3A is an illustration of the components within the prior art rotor control system by Paulos in U.S. Pat. No. 9,914,535.
Figure 3B:
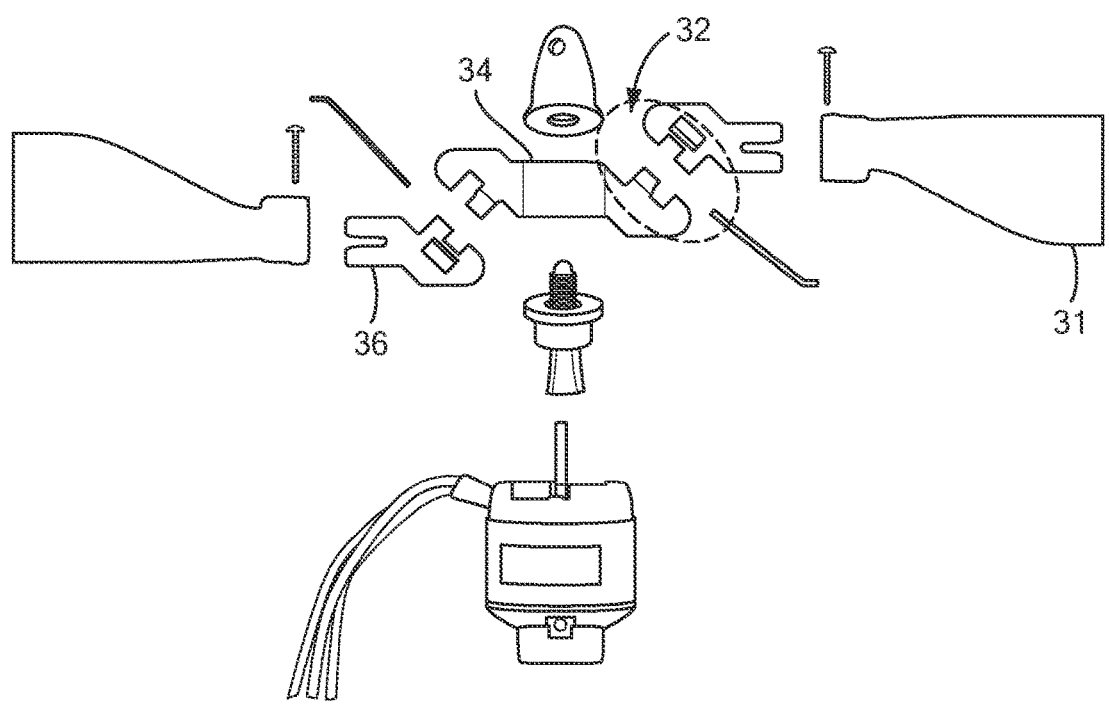
FIG. 3B is an exploded view of the rotor control system by Paulos in U.S. Pat. No. 9,914,535.
Figure 4A:
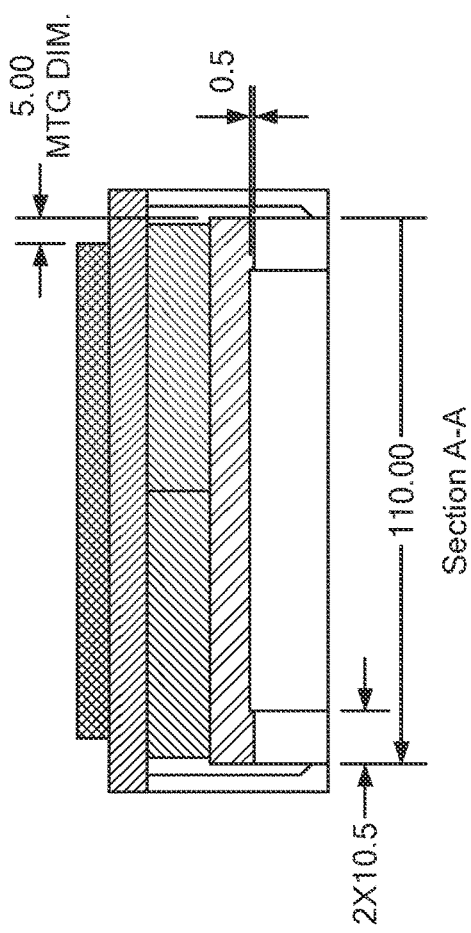
FIG. 4A is a perspective view of a prior art limited angle direct-drive motor (LADDM) from Wang et al.
Figure 4B:
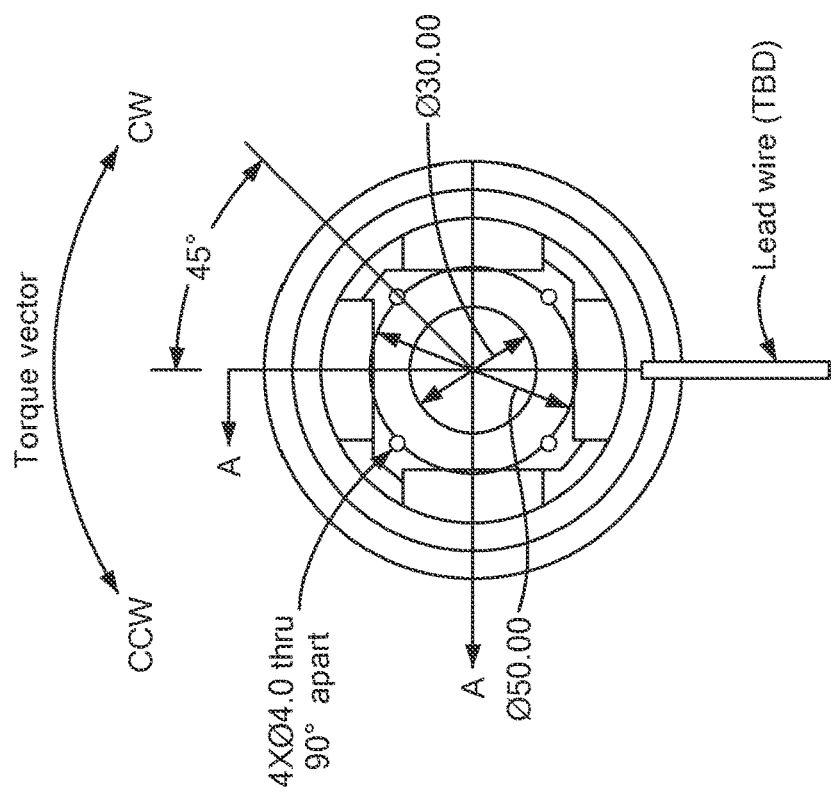
FIG. 4B is a cross-sectional view A-A of the LADDM from FIG. 4A.
Figure 4C:
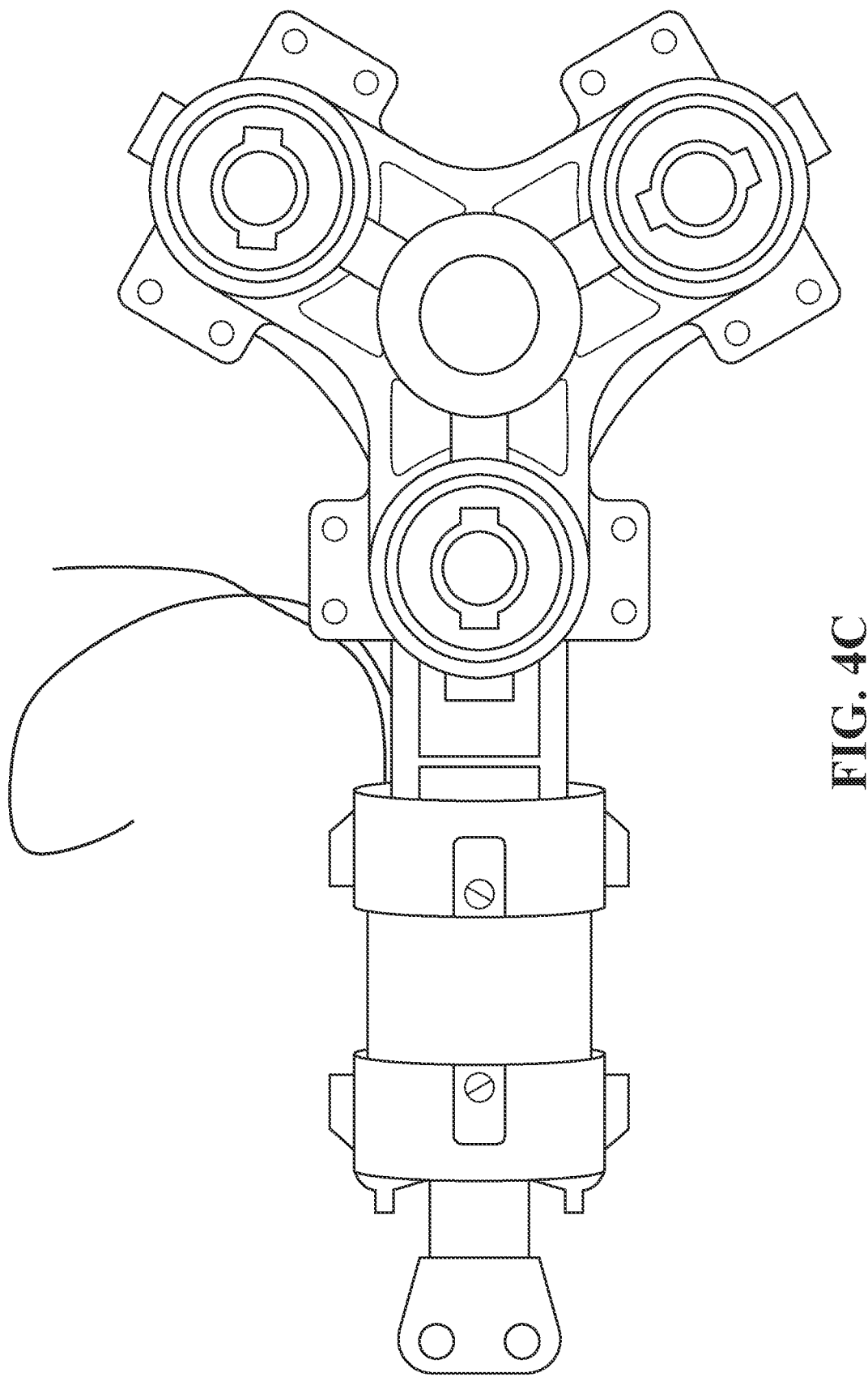
FIG. 4C is a perspective view of a prior art LADDM mounted to a three-bladed helicopter rotor hub, from Wang et al.
Figure 4D:
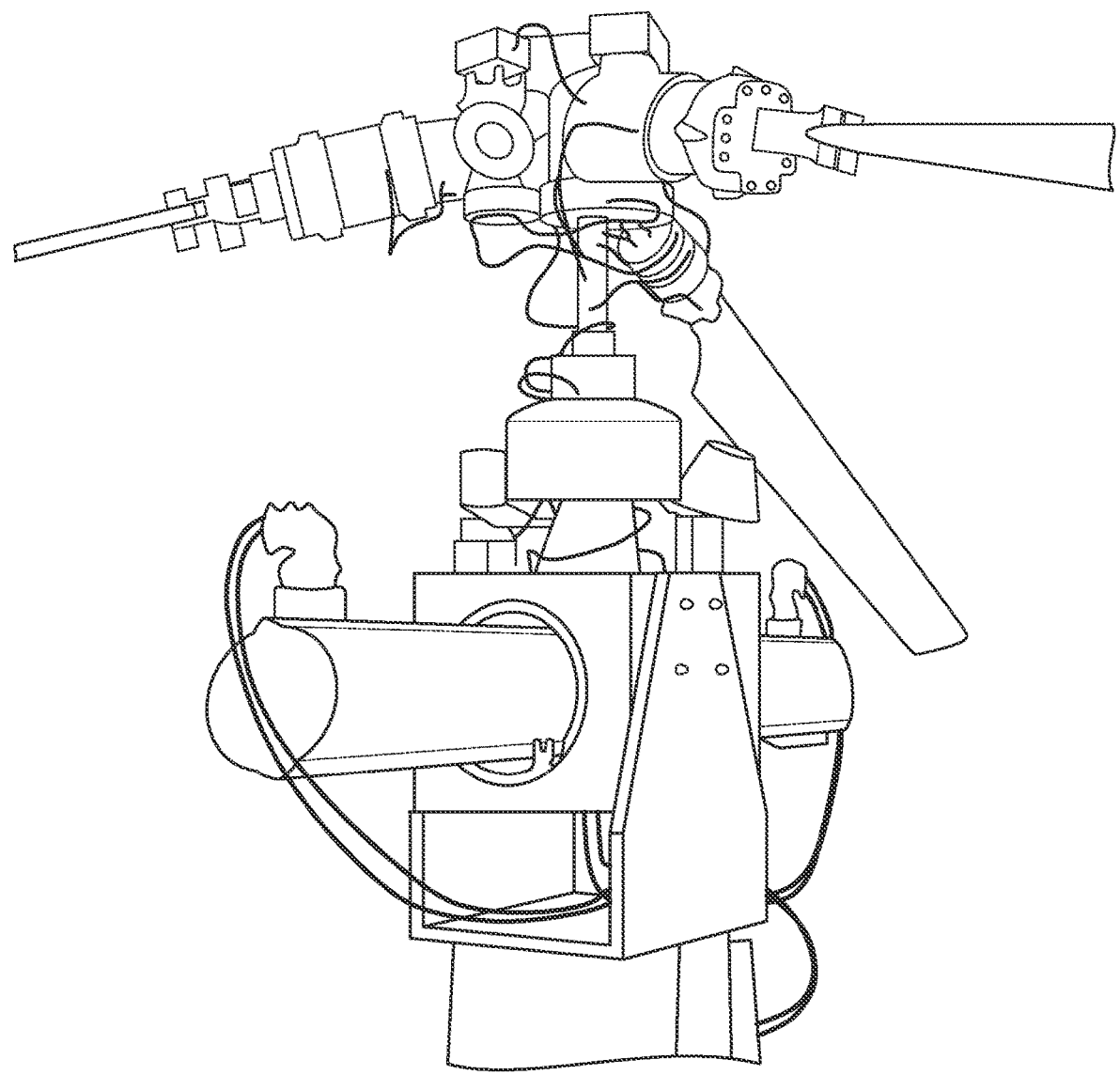
FIG. 4D is a perspective view of a prior art three-bladed swashplateless helicopter rotor on a test stand, from Wang et al.
Figure 5A:
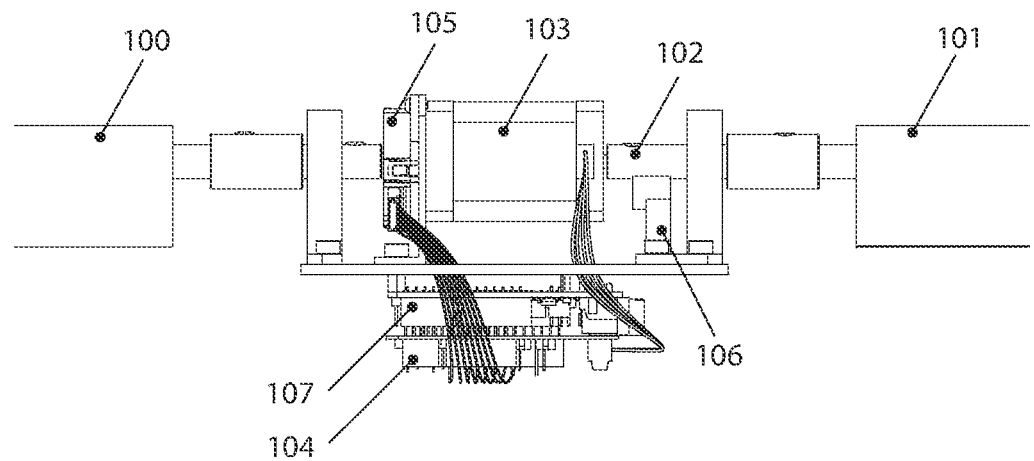
FIG. 5A is a front view of an exemplary on-axis cyclic control mechanism, including a two-bladed rotor with a pitch angle shaft articulated by a stepper motor, controlled by a computer with motor driver, in accordance with an embodiment of the present invention.
Figure 5B:
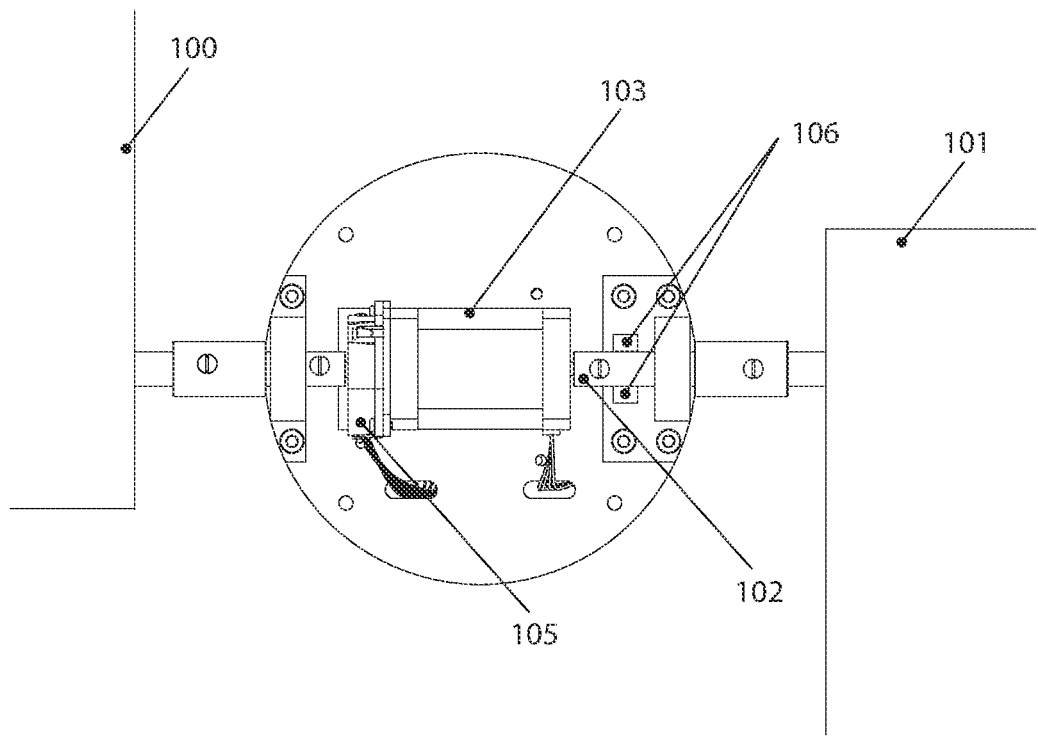
FIG. 5B is a top view of the exemplary on-axis cyclic control mechanism of FIG. 5A.
Figure 5C:
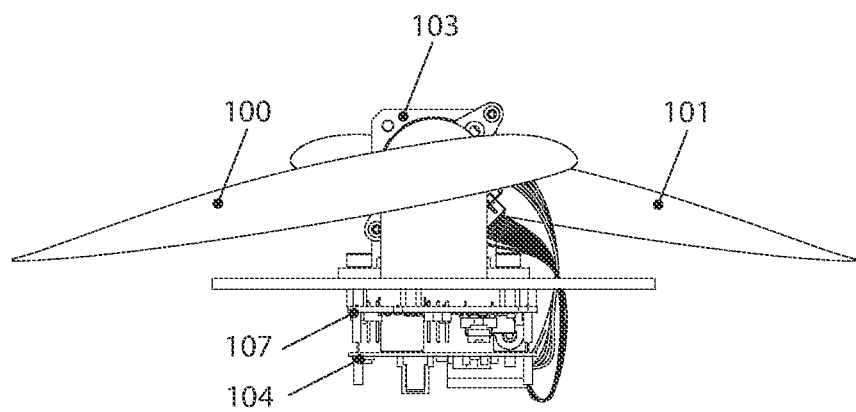
FIG. 5C is a side view of the exemplary on-axis cyclic control mechanism of FIG. 5A.
Figure 5D:
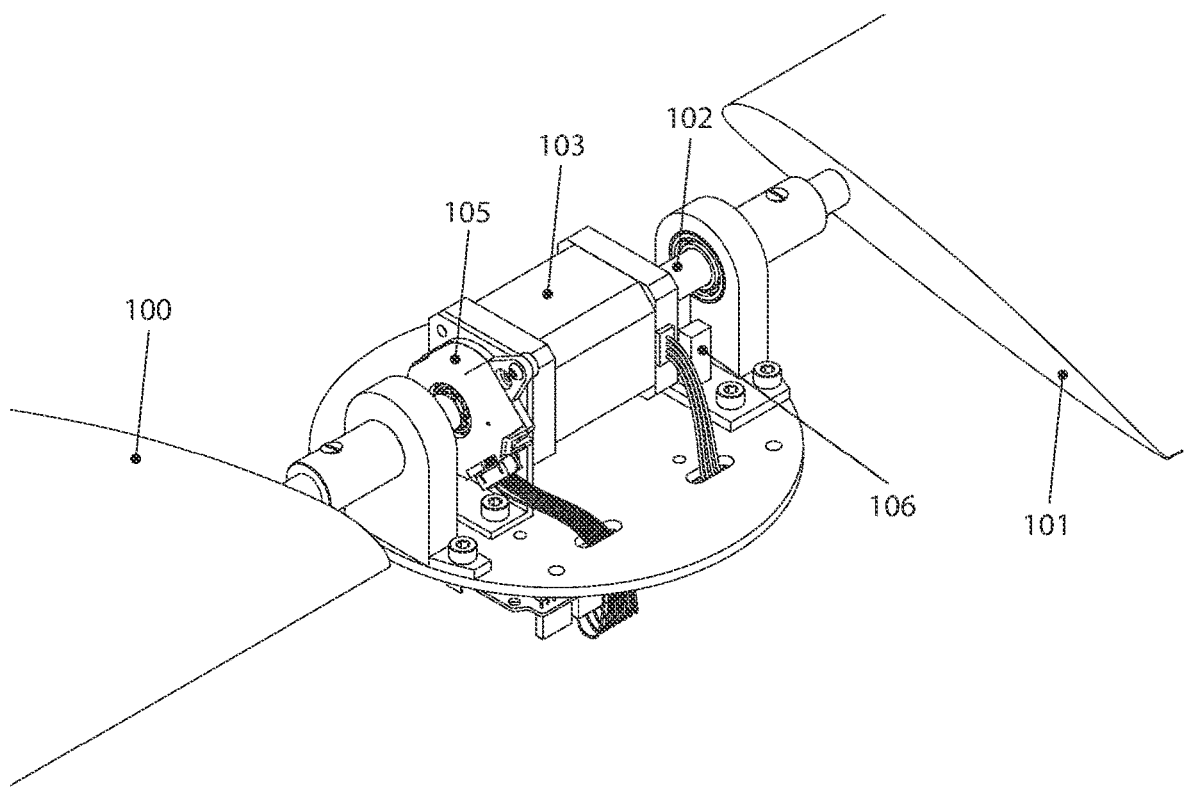
FIG. 5D is a close perspective view of the exemplary on-axis cyclic control mechanism of FIG. 5A.
Figure 5E:
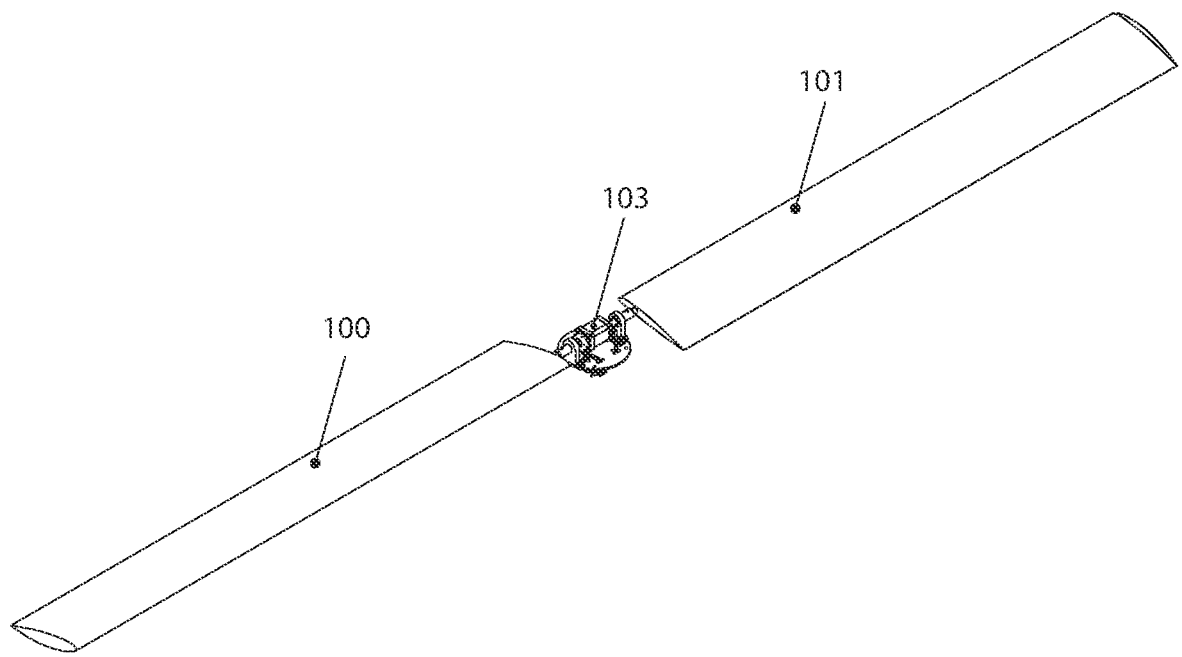
FIG. 5E is a wide perspective view of an exemplary on-axis cyclic control mechanism of FIG. 5A.
Figure 6A:
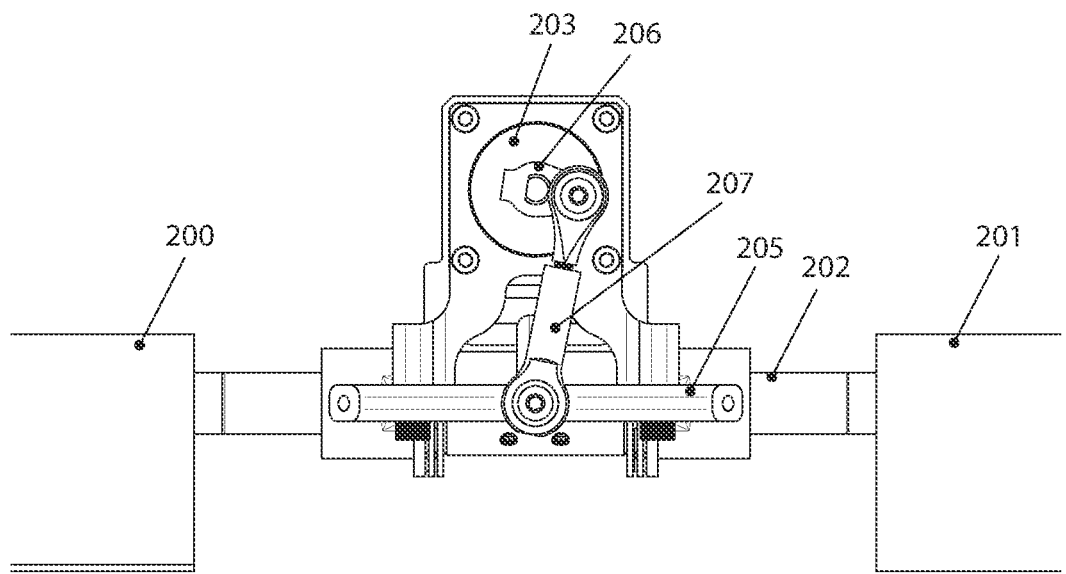
FIG. 6A is a front view of an exemplary off-axis leveraged cyclic control mechanism, including a two-bladed rotor with a pitch angle shaft articulated by a stepper motor, in accordance with an embodiment of the present invention.
Figure 6B:
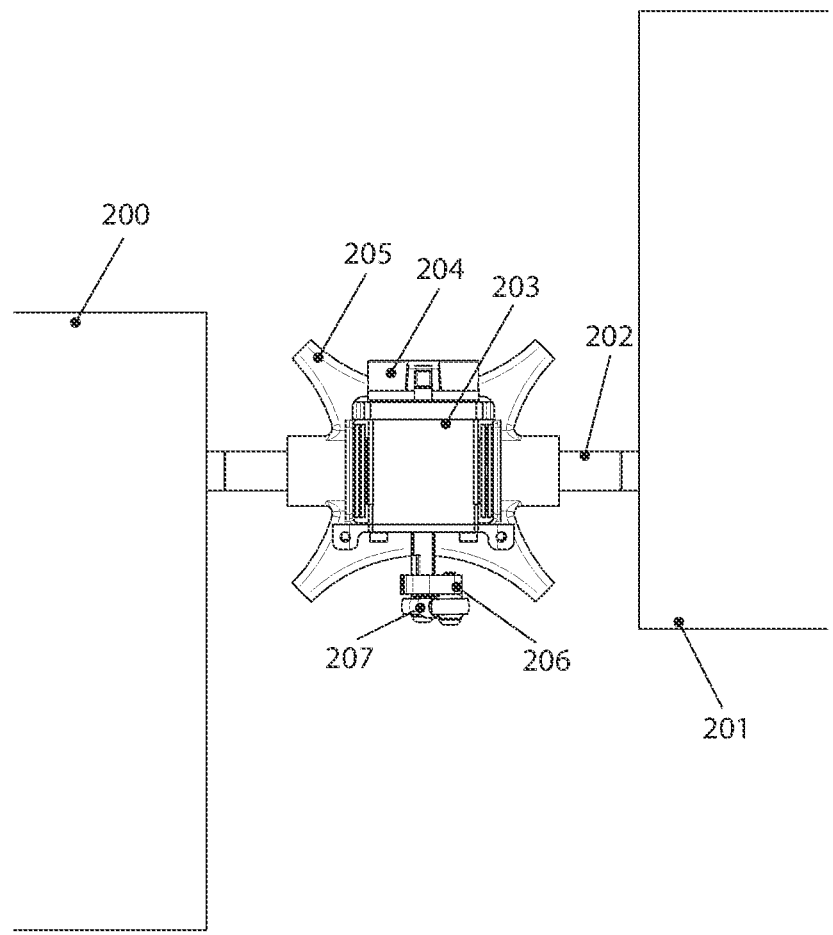
FIG. 6B is a top view of the exemplary off-axis leveraged cyclic control mechanism of FIG. 6A.
Figure 6C:
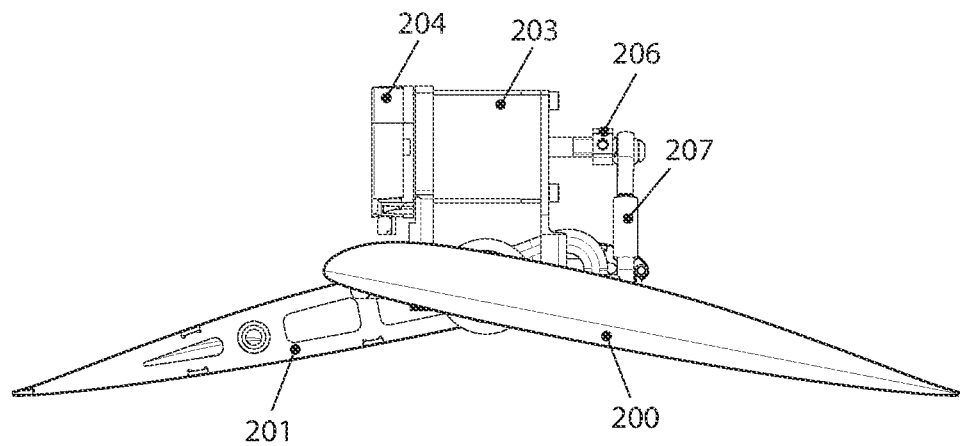
FIG. 6C is a side view of the exemplary off-axis leveraged cyclic control mechanism of FIG. 6A.
Figure 6D:
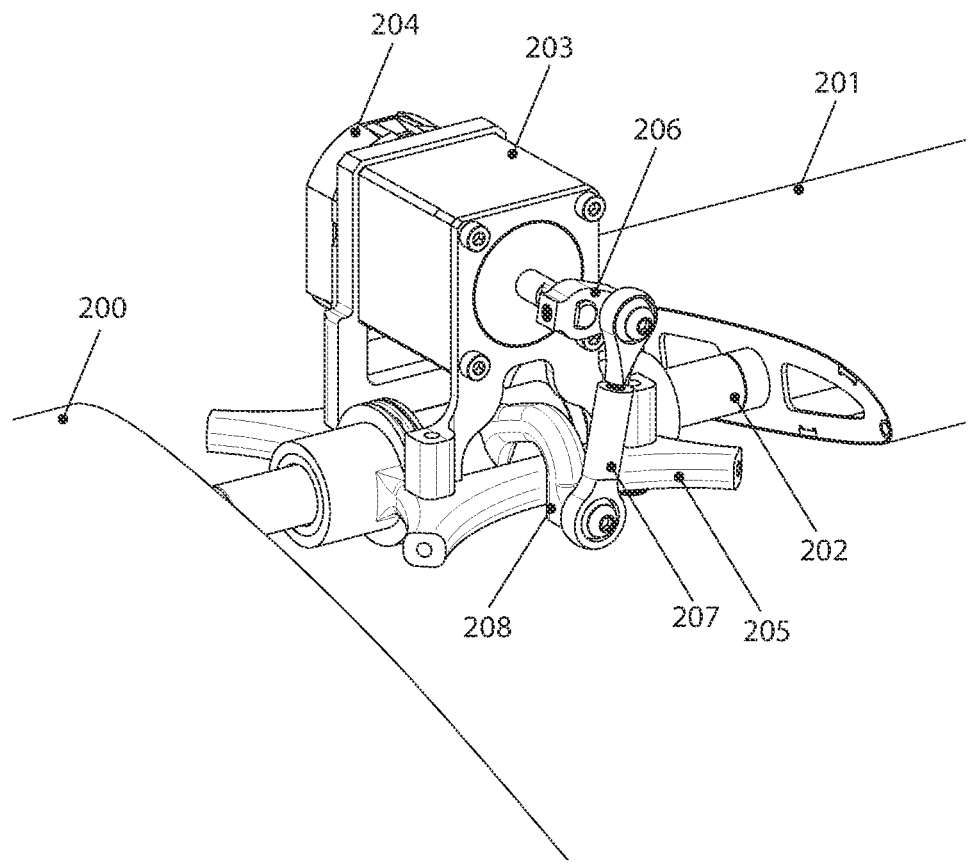
FIG. 6D is a close perspective view of the exemplary off-axis leveraged cyclic control mechanism of FIG. 6A.

FIG. 6A through 6E illustrate another embodiment of the cyclic control mechanism, whereby the articulation occurs off-axis. FIG. 6A is a front view of an exemplary off-axis leveraged cyclic control mechanism, including a two-bladed rotor with a pitch angle shaft articulated by a stepper motor, in accordance with an embodiment of the present invention. In FIG. 6A, the short motor actuator arm 206 is in a position corresponding to neutral cyclic pitch adjustment. As with the prior embodiment, two rotor blades 200 and 201 share a common pitch angle shaft 202, mounted with bearings through the base bracket 205. In this embodiment, the cyclic stepper motor 203 is coupled to the common pitch angle shaft 202 through a short actuator arm 206, a double-ended ball linkage set 207 (i.e., wherein each end of the linkage is configured with a ball joint or similar mechanism), and a long actuator arm 208. The stepper motor 203 causes rotation of the short arm 206. Rotation of the short arm 206 is translated by the ball linkage set 207 to reciprocation of the lower ball of the ball linkage set 207. In turn, reciprocation of the lower ball of the ball linkage set 207 causes rocking of the long actuator arm 208 and therefore rocking of the pitch angle shaft 202 as required for cyclical adjustment of pitch of the blades. Of note in this embodiment, the axis of rotation for the shaft of the cyclic motor 203 is not only displaced from the axis of rotation of the common pitch angle shaft 202, but is also orthogonal to the axis of rotation of the common pitch angle shaft 202.

The combination of the short actuator arm 206, the ball linkage set 207, and the long actuator arm 208, provides a mechanism to achieve leverage, similar to a gear-reduction mechanism. The connection point of 206 to 207 occurs along the circumference traced by 206, as cyclic motor 203 turns. The total mechanical circumference traced by the short arm 206 is the distance, from the center of the cyclic motor 203 shaft, to the center of the connection between the short arm 206 and the ball linkage set 207, multiplied by two to compute the diameter, and multiplied again by pi to compute the circumference. In comparison, the total mechanical circumference traced by the long actuator arm 208, acting about the pitch angle shaft 202, is the distance from the center of the pitch angle shaft 202, to the center of the connection of the long actuator arm 208 and the ball linkage set 207, multiplied by two and then by pi. Because the circumference traced by the short arm 206 is much smaller than the circumference traced by the long actuator arm 208, the cyclic motor 203 must turn over an angle much greater than the required response on pitch angle shaft 202. Unlike a gear-reduction mechanism, however, the short arm 206 and the long arm 208 are not directly meshing gears, but rather actuator arms coupled through ball linkage set 207. Over a narrow range of movement, the leverage is approximated as the ratio of the two circumferences. On the other hand, as cyclic motor 203 moves away from the neutral cyclic position, the leverage increases, because the angle between of the short arm 206 and the ball linkage set 207 changes. In the neutral cyclic position, the angle is a right angle, and, with further rotation, the angle initially increases in a manner wherein the motor must move a significant angular distance in order cause a relatively smaller displacement of the long arm 208.

The leverage achieved through the combination of the short arm 206, the ball linkage set 207 and the long arm 208, has the effect of multiplying the torque of cyclic motor 203, as it applies to pitch angle shaft 202. In some embodiments, the short arm is implemented as a cam. In these cam embodiments, the cam causes motion of the ball linkage set 207 in a manner analogous to the embodiment using the short arm 206. In other embodiments, any eccentric is used instead of a cam or short arm. In the prior embodiment, illustrated in FIG. 5A through FIG. 5E, the stepper motor is a standard NEMA14 stepper motor, having a maximum holding torque of 23 N-cm. In the off-axis embodiment with leverage, the size and weight of the stepper motor can be reduced to a NEMA11 stepper motor, having a maximum holding torque of 5.2 N-cm.

Figure 6E:
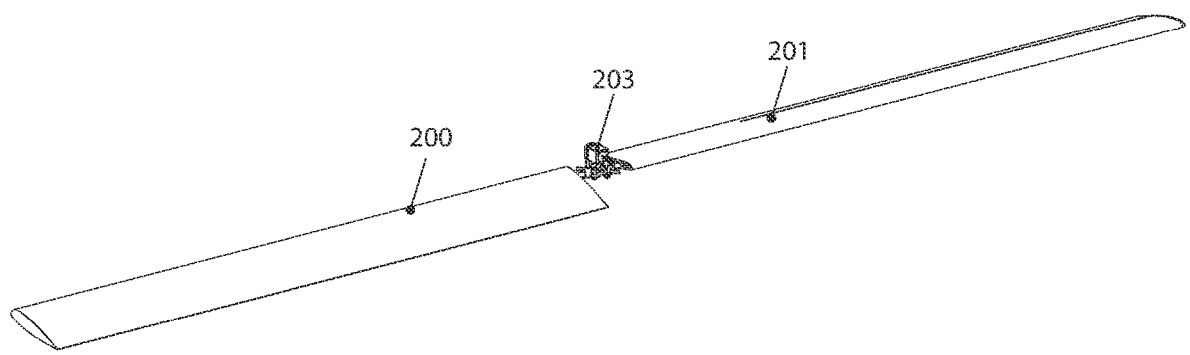
FIG. 6E is a wide perspective view of the exemplary off-axis leveraged cyclic control mechanism of FIG. 6A.
Figure 7:
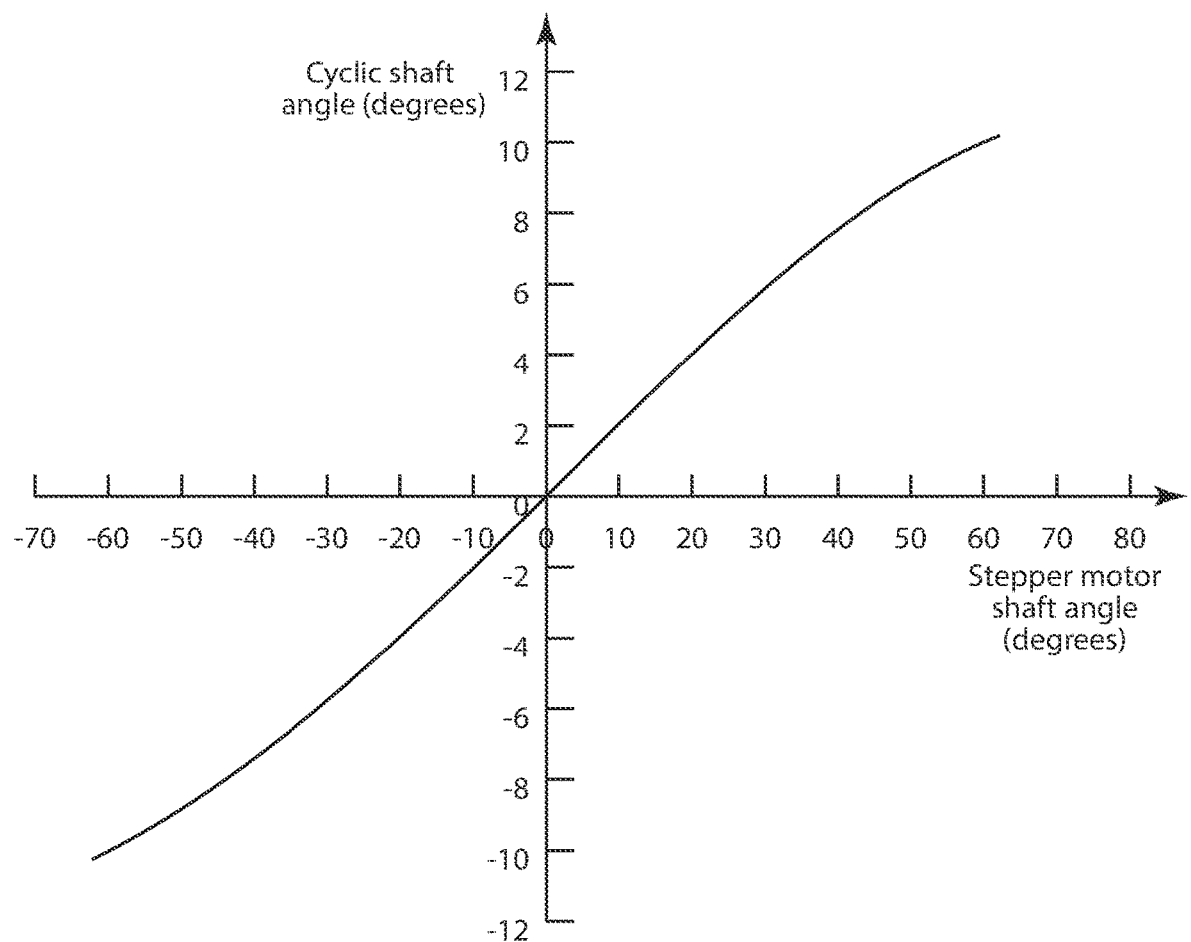
FIG. 7 is a graph illustrating the exemplary relationship between the stepper motor shaft angle and the resulting cyclic shaft angle, for the exemplary off-axis leveraged cyclic control mechanism, in accordance with an embodiment of the present invention.

While the mechanical configuration of the cyclic mechanism illustrated in FIG. 6A though FIG. 6E provides leverage, the relationship between the stepper motor shaft angle and the cyclic shaft angle is not linear, as the leverage increases over the rotation of cyclic motor 203 from a neutral cyclic position, as described above. For this embodiment, the range of motion of the cyclic motor is over the range of +60 degrees and −60 degrees, relative to the neutral position shown in FIG. 6A. However, one can envision the effect of moving to positions of +90 degrees and −90 degrees. At these specific positions, the instantaneous coupling from the stepper motor shaft to the common cyclic shaft is brought to zero. In FIG. 7, the relationship between the stepper motor shaft angle, operating over a range of +60 degrees to −60 degrees, is shown relative to the cyclic shaft angle, which varies over a range of +10 degrees and −10 degrees. The flight control computer must take this non-linear relationship into account when commanding a cyclic motor position.

Because the cyclic control system has no means to adjust the pitch of the blades in a correlated fashion, the equivalent of collective control must occur through the variation of angular velocity of the main drive motor. This can be viewed as an advantage relative to traditional helicopters, in the sense that the rotor blades can operate at their optimal angle of attack with regard to lift-to-drag ratio, varying instead the velocity of the blade through the air to increase or decrease the rotor thrust. In the neutral cyclic position, both blades have the same incidence or pitch angle, which is a fixed design choice for the rotor system. As with all rotorcraft, the incidence angle represents the sum of the blade angle of attack and the inflow angle resulting from the flow of air through the rotor. The inflow angle contains the induced velocity as well as any climb velocity. For one embodiment of the cyclic control system, the inflow angle of the rotor, at the 75% position of radius, in a hovering condition, is 4 degrees. This embodiment uses uniform and non-tapered blades with the VR-12 airfoil profile. For this embodiment, an angle of attack of 7 degrees, operating at a Reynolds number of 200k, results in the best lift-to-drag ratio. Thus, for the embodiment described, the combined blade incidence angle is chosen as 11 degrees.

Several enhancements to blade designs offer improved rotor efficiency. These same enhancements may be applied to embodiments of the cyclic control system to improve the rotor efficiency. Some of these design changes include: blade taper, blade twist, sweep near the blade tips, and anhedral in conjunction with sweep near the blade tips. Prior research concludes that the thrust can be improved by approximately 7 percent relative to a uniform non-twisted blade through the careful application of these enhancements.

The calculation of the minimum required cyclic motor holding torque must account for the cumulative moment of the two rotor blades acting on the common shaft. When the angles of attack of both blades match, at the neutral position of zero cyclic response, and the rotorcraft is in a hovering condition, the torque from one blade exactly counteracts the torque from the other blade, because the torques are applied from opposing sides of the common shaft. As the cyclic motor creates differential blade incidence, the diverging pitching moment coefficients begin to require increasing holding torque from the cyclic motor. For many airfoil cases, the maximum required holding torque will occur at the extremes of cyclic response.

FIG. 8 is a set of tables providing a comparison of exemplary airfoils and their combined pitching moment coefficient over a range of cyclic responses, in accordance with an embodiment of the present invention. More specifically, FIG. 8 provides an analysis of four popular airfoils with regard to the cumulative pitching coefficient, operating over a cyclic response range of ±7 degrees. Reiterating the work of prior researchers, a symmetric airfoil, such as NACA0012, offers the lowest individual blade and combined pitching moment coefficients, though with the lowest coefficient of lift. At the other extreme, a high-lift airfoil, such as FX63-137, has a high pitching moment coefficient for an individual blade. Interestingly however, the combined pitching moment coefficient is much lower than that of an individual blade, again due to the opposing torques. Nevertheless, a compromise airfoil, such as VR-12, has a lower combined pitching moment, while offering a comparable coefficient of lift.

Once the choice of airfoil, blade pitch angle, cyclic range, blade area, blade chord and rotor speed have been made, the overall static torque acting on the common pitch angle shaft is calculated through the following:

$$M = C_{m1} \cdot q \cdot S \cdot c - C_{m2} \cdot q \cdot S \cdot c$$

$$M = (C_{m1} - C_{m2}) \cdot q \cdot S \cdot c$$

$C_{m1}$: Pitching moment coefficient, Blade 1
$C_{m2}$: Pitching moment coefficient, Blade 2
q: Dynamic pressure
S: Blade area
c: Blade chord $$q = \frac{1}{2}\rho v^2$$

ρ: density of air
v: localized air speed
For rotorcraft v scales with spanwise position, r $$v = \frac{r \cdot v_{tip}}{R}$$

R: blade length $$M = \frac{1}{2}[C_{m1} - C_{m2}] \cdot \rho c^2 \int_O^R \left[\frac{rv_{tip}}{R}\right]^2 dr$$

$$M = \frac{1}{2}[C_{m1} - C_{m2}] \cdot \rho c^2 \frac{v_{tip}^2}{R^2} \int_O^R r^2 dr$$

$$M = \frac{1}{2}[C_{m1} - C_{m2}] \cdot \rho c^2 v_{tip}^2 \cdot \frac{1}{R^2} \cdot \left[\frac{1}{3}r^3\right]_0^R$$

$$M = \frac{1}{6}[C_{m1} - C_{m2}] \cdot \rho v_{tip}^2 \cdot c^2 \cdot R$$

$$M = \frac{1}{6}[C_{m1} - C_{m2}] \cdot \rho v_{tip}^2 \cdot S \cdot c$$

The cyclic motor, operating with or without leverage or gear-reduction, must induce a pitch angle shaft holding torque that exceeds the maximum combined pitching torque to achieve the desired cyclic response. In addition, the dynamic movement of the common pitch angle shaft creates the need for additional torque to reverse the angular momentum every half rotation of the rotor. The angular momentum in this case is about the axis of the cyclic shaft. Since the blade chord is narrow relative to the rotor diameter, and the angular velocity is low due to the narrow cyclic range, the rotational kinetic energy in the cyclic process is modest, and the additional torque requirement is much lower than the blade pitching torque, for the embodiments considered as part of this application. Nevertheless, the additional dynamic torque will vary by embodiment, and needs to be considered.

The cyclic motor in embodiments of the present invention operates as a limited-angle motor. Embodiments of the cyclic motor include electric motors that are physically limited in their angular range of operation, as well as rotary motors that are capable of spinning through 360 degrees, though software limited, and optionally with hard stops, in their angular movement. Some embodiments of the present invention implement the cyclic motor using one of the following three types of motor:

A Single-phase Limited Angle Torque (LAT) motor
A Two-phase Stepper motor
A Three-phase Brushless DC (BLDC) motor Limit Angle Torque (LAT) motors are a special class of brushless DC motors that operate over a limited angular range. These motors are used in high-response, precision control systems. While far from a high-volume motor class, LAT motors are used in a range of aerospace, semiconductor, medical and military applications. As described in Wang et al., such motors can achieve superior torque densities compared with most BLDC motors. Unlike other BLDC motors that are wound for two and three-phase operation, an LAT motor is generally wound for single-phase operation, making the control very simple from a hardware perspective. The LAT motor is an excellent choice for an embodiment of the described cyclic control system. One notable disadvantage, however, is that LAT motors are low-volume devices used in high-precision applications, and thus costs tend to be many times greater than for other types of high-volume BLDC motors of a similar power rating.

For cost sensitive embodiments of the cyclic control system, a compromise choice of motor is the widely available stepper motor, typically with two coil windings. Stepper motors are available in three designs: permanent magnet, variable reluctance, and hybrid. The most popular design is the hybrid stepper motor, employed within a wide range of robotic and electromechanical applications. The commonly available stepper motors have 200 full steps per revolution, meaning that the motor increments by 1.8 degrees in each of the four phases applied to the two motor windings. Exploiting the opportunity to apply a variable amplitude signal to the two motor windings, the stepper motor can be "microstepped," for example by half, quarter, or one-eighth step increments. In fact, a controller capable of applying an arbitrary pair of analog voltages to the motor windings offers continuously variable rotor positioning, similar to what can be achieved with an LAT motor. Practically speaking, a stepper motor operating at half steps offers an acuity of 0.9 degrees, which is accurate enough for many embodiments of the cyclic control system.

FIG. 9A is a photograph of an exemplary dual-shaft stepper motor 901, having the standard NEMA14 form factor. FIG. 9B provides a state table describing the voltages required on the two-phases $\varphi_1$ and $\varphi_2$ of the motor, in order to achieve half-step operation, for either clockwise or counter-clockwise operation, in accordance with an embodiment of the present invention. Because the cyclic response is applied for each revolution of the rotor, the pilot or flight control computer has many opportunities for fine adjustment of the cyclic response in order to maintain aircraft stability. Minor errors in blade pitch are filtered through the accumulated effect of the rotor spinning multiple times each second.

Other embodiments of the present invention use a three-phase BLDC motor for the cyclic control system. For this particular application, the "DC" naming is somewhat misleading. While many rotary applications of BLDC motors employ motor drivers that commutate DC voltages across an "H bridge" with six transistor switches, the cyclic motor application requires an AC motor driver often described as a "Field Oriented Control" (FOC) motor driver. The FOC motor driver applies an analog voltage to each of the three motor phases, providing a means for variable speed, position and torque. Operating as the cyclic motor, the FOC motor driver maintains position until instructed by the computer to move, while modulating the torque to prevent unwanted rotation. While Wang et al. are generally correct about the superior torque density of LAT motors compared to three-phase BLDC motors, some embodiments use a relatively recent category of three-phase BLDC motor that has emerged for gimbal applications and offering a torque density comparable that of LAT motors.

Two additional components operating in conjunction with the cyclic motor improve the reliability and efficiency of the cyclic control embodiment. Referring to FIG. and FIG. 6B, these components are: (a) an angular position sensor, typically and herein called a "rotary encoder," shown as 105 and 204, and (b) physical hard stops 106, to prevent the shaft 102 from rotating far beyond the maximum required blade pitch range. Rotary encoders are available in two varieties, either having an absolute position capability, or offering incremental position. The latter type is more common and affordable. Most incremental encoders offer an indexing function, to enable the computer 107 that controls the cyclic motor 103 to initialize operation at the index position, and then move clockwise or counter-clockwise, counting the incremental angular progression. For the cyclic control embodiments, the ideal indexing location is typically at the angular position at which the incidence angle of the two rotor blades 100, 101 are the same, that is, where there is no blade pitch differential. The physical hard stops 106 add protection so that there are no conditions wherein the motor 103 drifts far from the operating range, requiring the motor 103 to rotate over large angles to become operable. Such a phenomenon could occur, for example, when the system has been deenergized, and wind causes the rotor blades 100, 101 to turn on the common cyclic shaft 102. In other embodiments, the hard stops can serve as secondary indexing positions, or as primary indexing positions when using an incremental encoder without an indexing function. When the motor 103 has reached the position of a hard stop 106, the encoder 105 stops incrementing, yet the motor controller 104 senses that maximum current is flowing, indicating that the maximum torque is applied. The computer 107 uses this condition to establish an index position. Such an approach normally is inferior to indexing from the zero cyclic position, however, because the hard stop position is at the far end of the operating range.

Torque density, which is the amount of torque the motor can generate for a given mass, is an important performance metric when choosing a motor. In this regard, the LAT motor is superior to a classic stepper motor by as much as a factor of two. Beyond the selection of the cyclic motor and its impact on the total aircraft mass, another important design consideration is reducing the cyclic motor power requirements to a level as low as possible while still achieving and maintaining the required shaft position. Certainly, the cyclic control system power should be a small fraction of the power to create thrust. With an LAT motor, power optimization occurs naturally, as the current must be increased to achieve a required position, accounting for the torque acting upon the system. With a stepper motor, the two motor windings act in opposition to one another. Applying excess current to the windings can solidly hold the rotor position, though this comes at the cost of excess power consumption. The computer controlling the stepper motor should adjust the motor current such that the desired position is achieved and maintained, as indicated by incremental encoder progress, though avoiding excess motor current. This balance is achieved by monitoring the rotary encoder, observing lost steps as a means to apply just enough stepper motor current, and hence motor torque. As a further refinement to the power conservation when using a stepper motor, the pitching moment coefficients illustrated in FIG. 8 inform the required holding torque as a function of angular position. For example, the stepper motor holding current requirement must increase by a factor of four from the narrow range within 2 degrees of neutral, to the full excursion region between 5 and 7 degrees of neutral.

A classic mechanical swashplate introduces a pitch angle cyclic response that is sinusoidal, with a period synchronized with the rotor head angular position. This naturally occurs as a circular swashplate path is tilted, and the pitch is proportionate to the vertical offset of the pitch rods. In contrast, the electric rotorcraft cyclic control system has the freedom to introduce an infinite variation of cyclic responses, including arbitrary odd harmonics of the rotor frequency. In some embodiments, the cyclic control system generates a periodic cyclic response that, at times, is not a pure sinusoid, but includes multiple harmonics of the rotor frequency. For the analysis of an embodiment emulating the classic swashplate, we will consider a sinusoidal response, whereby the phase angle represents the angular position of the thrust vector offset, and the magnitude of the sinusoid is proportionate to the distance of the thrust vector offset from the rotor center. As previously discussed, the electric rotorcraft cyclic control system does not modify the rotor collective, requiring an adjustment of the main motor angular velocity to change the magnitude of the integrated thrust.

In some embodiments of the cyclic control system, the cyclic motor control computer has very limited functionality, acting upon commands initiated by the flight control computer, moving the limited angle motor to a desired pitch angle. In other embodiments, the flight control computer indicates to the cyclic control computer the desired thrust offset angle and magnitude, and the cyclic control computer calculates the required sinusoidal response. With additional knowledge of the rotor angular position, the cyclic control computer can then apply the required cyclic angle positional information through the motor driver.

Considering the integration of the cyclic control system into a rotorcraft, some embodiments include electrical components within a rotating frame of reference, and other electrical components that are in a stationary frame of reference, or potentially counter-rotating frame of reference. In some embodiments, signals and power are conveyed between the rotating and stationary frames of reference, a requirement affecting design considerations. Classic slip rings offer a simple means to convey electric signals across rotating interfaces, though the physical contact of brushes against the slip rings inherently limits the life of such devices. An alternative means of conveying power and signals between rotating and stationary frames is a rotary transformer. The rotary transformer makes no physical contact, rather using the coupling of magnetic fields to convey signals and power.

Figure 10:
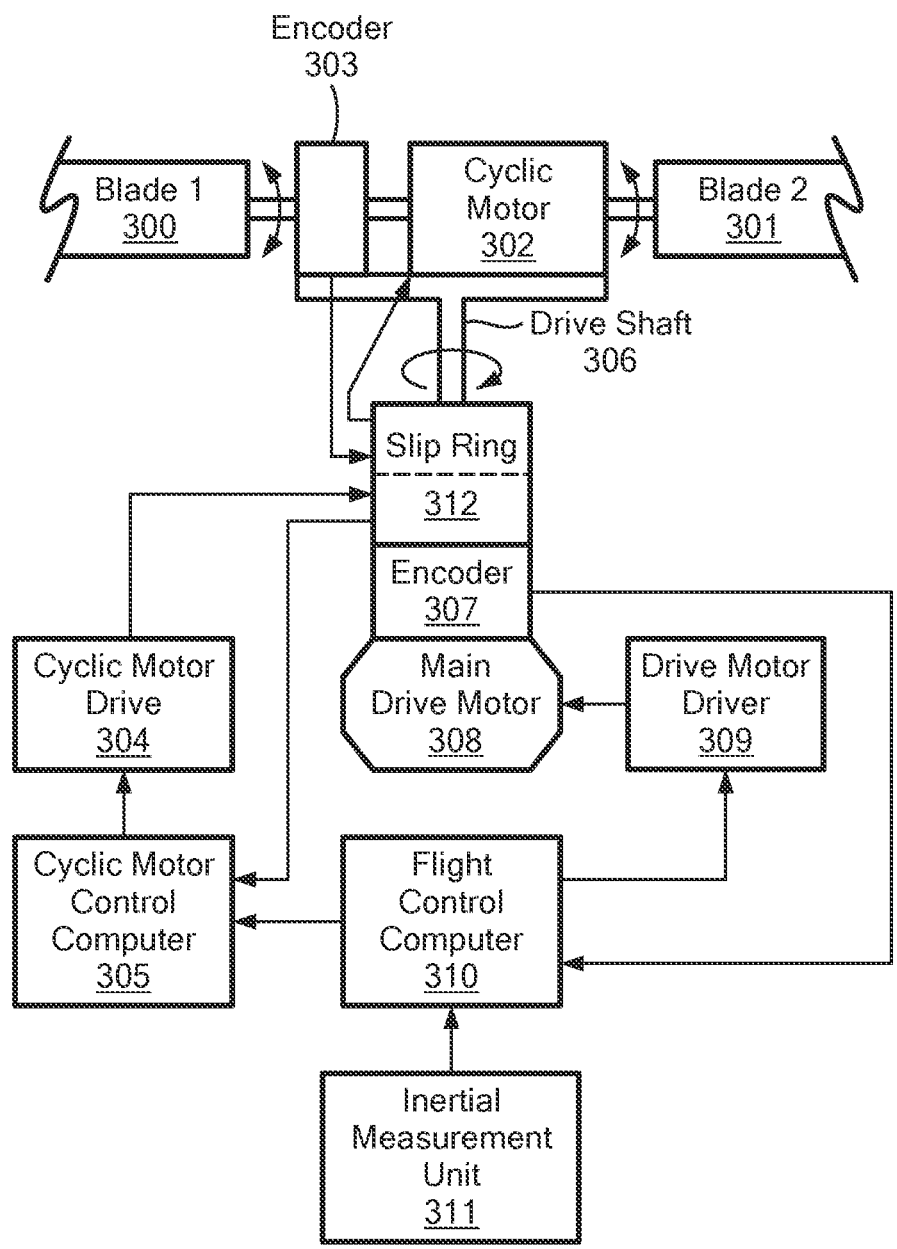
FIG. 10 is an exemplary block diagram of the cyclic control system integrated with a flight control system, in accordance with an embodiment of the present invention.

FIG. 10 is an exemplary block diagram of the cyclic control system integrated with a flight control system in accordance with an embodiment of the present invention. In this embodiment, a slip ring 312 conveys signals between the stationary frame and the rotating frame. The lower portion of slip ring 312, below the dashed line, is within the stationary frame of reference, including the encoder 307, main driver motor 308, and other components below the dashed line. The upper portion of the slip ring 312, above the dashed line, is within the rotating frame of reference of 300, 301, 302, and 303. The slip ring 312 provides electrical circuits to connect cyclic motor drive 304 with cyclic motor 302, and encoder 303 with cyclic motor control computer 305, by allowing the signals to pass between the stationary frame below the dashed line in 312, and the rotating frame above the dashed line.

Within the rotating frame, rotor blades 300 and 301 share a common pitch angle shaft, connected through the cyclic motor 302 and the encoder 303. The main drive motor 308 turns the drive shaft 306, which passes through encoder 307, and slip ring 312, causing the assembly 300, 301, 302, and 303, to be in rotary motion. As illustrated, the flight control computer 310 receives sensor input from the inertial measurement unit 311 and the drive shaft rotary encoder 307, and then adjusts the main drive motor 308 angular velocity or torque through the drive motor driver 309, while also computing the desired cyclic response, periodically instructing the cyclic motor control computer 305, through the cyclic motor driver 304, to move the limited angle motor 302 to a new position.

In one embodiment of the cyclic control system, a hybrid stepper motor is employed as the limited angle motor, and a cyclic motor control computer receives a PWM signal from the flight control computer every 10 mS, indicating the desired position of the common blade pitch shaft.

Figure 11:
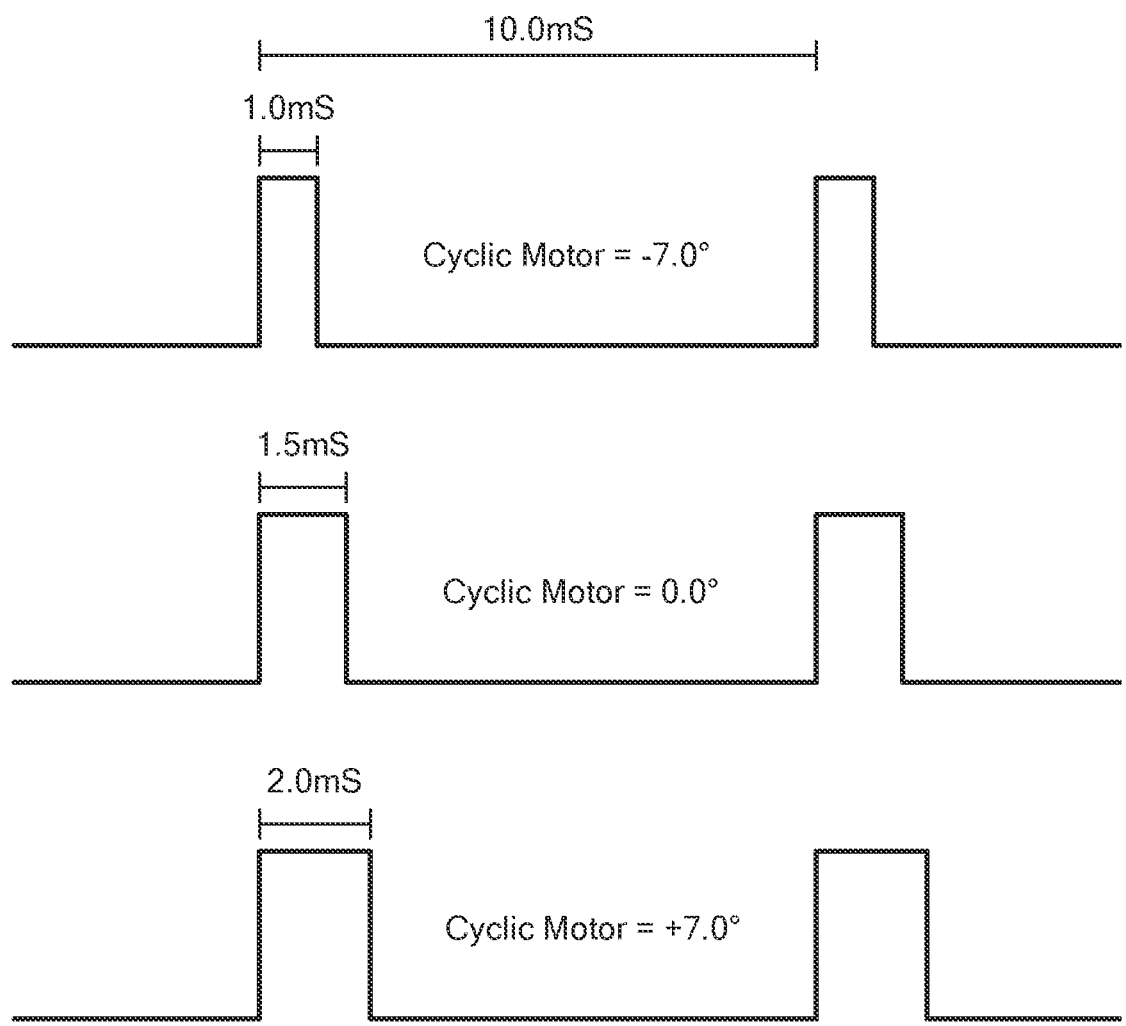
FIG. 11 is a plot of an exemplary Pulse-width modulation (PWM) signaling protocol, as would be conveyed from the flight control computer to the cyclic motor control computer, in accordance with an embodiment of the present invention.

FIG. 11 is a plot of an exemplary PWM signaling protocol, as conveyed from the flight control computer to the cyclic motor control computer in accordance with an embodiment of the present invention. FIG. 11 illustrates PWM signaling similar to that used for model aircraft. One embodiment of the cyclic control system uses a pulse width between 1 mS and 2 mS, to correspond with a required cyclic response between −7 degrees and +7 degrees for one blade, which is the opposite for the other blade. The neutral position of cyclic is represented by a 1.5 mS pulse width. For one embodiment, a neutral position results in both blades having an incidence angle of 11 degrees.

Figure 12A:
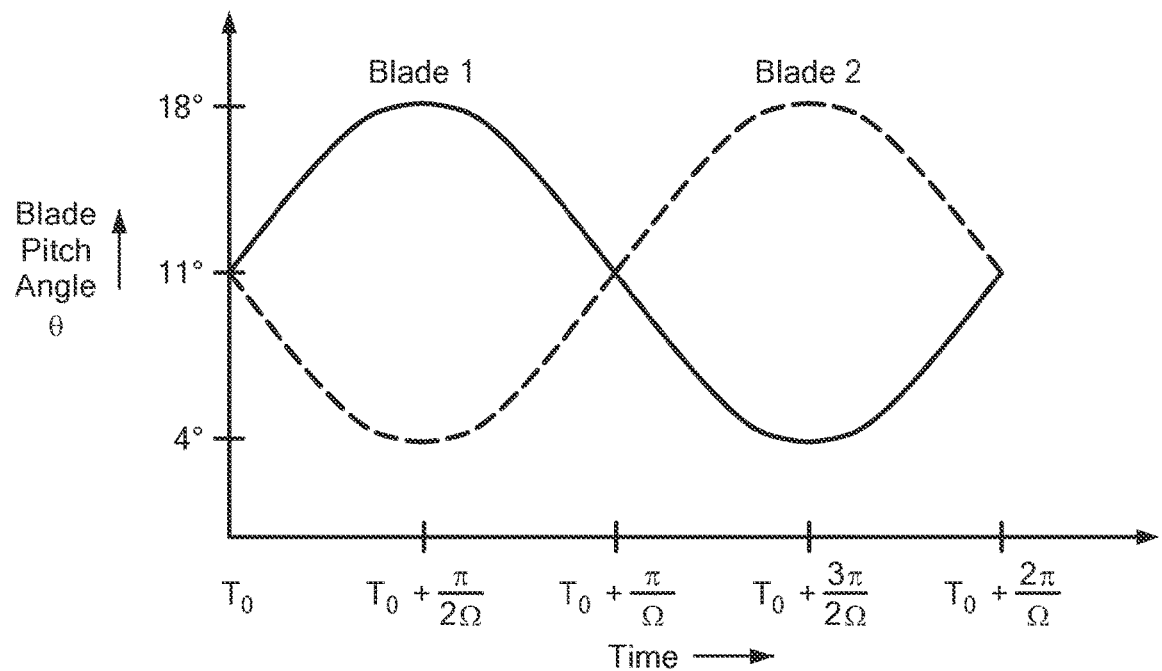
FIG. 12A and FIG. 12B are plots of blade pitch angle as a function of time to illustrate an exemplary sinusoidal cyclic response, idealized in FIG. 12A, and approximated in FIG. 12B.
Figure 12B:
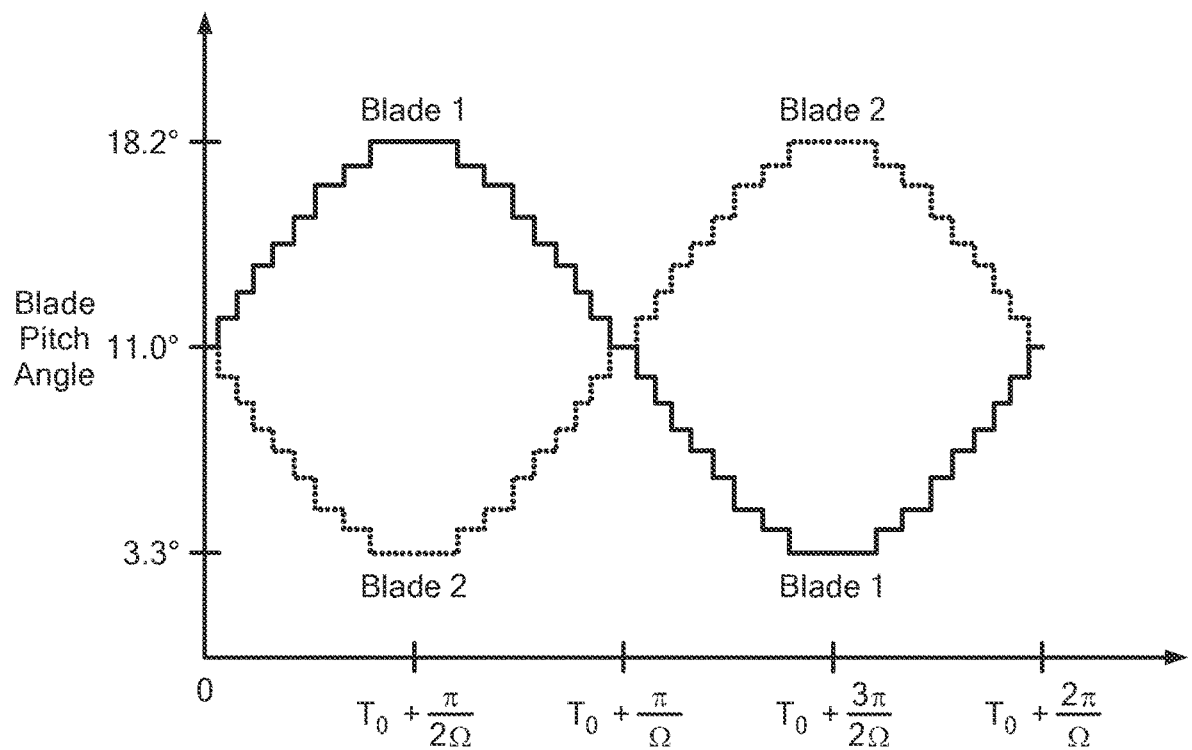

FIG. 12A and FIG. 12B are plots of blade pitch angle as a function of time, to illustrate an exemplary sinusoidal cyclic response, idealized in FIG. 12A, and approximated in FIG. 12B. For this embodiment, we will consider the on-axis coupling of the cyclic motor shaft with the common pitch angle shaft, providing a unitary relationship of input and response angles. The nominal blade incidence angle is 11 degrees, with a cyclic amplitude of ±7 degrees, in accordance with embodiments of the present invention. In FIG. 12A, we see an idealized incidence angle of the first and second blades as a function of time, corresponding with the angular position of the rotor head. As described in the preceding paragraph, the response of the first blade, with respect to the nominal incidence angle, is exactly the opposite of the second blade. This exemplary sinusoidal cyclic response is computed, for example, by the flight control computer 310 in FIG. 10. Because the cyclic position is updated in discrete time, with PWM signaling every 10 mS, and because one embodiment of the motor controller provides discrete 0.9-degree half-steps of the stepper motor, FIG. 12B illustrates the realized cyclic response, which approximates the idealized response from FIG. 12A. Realized errors of the cyclic response result in minor errors in the rotorcraft attitude, though these minor perturbations are addressed with subsequent updates to the flight control state machine, or inputs to the flight controls by the human pilot.

Figure 13:
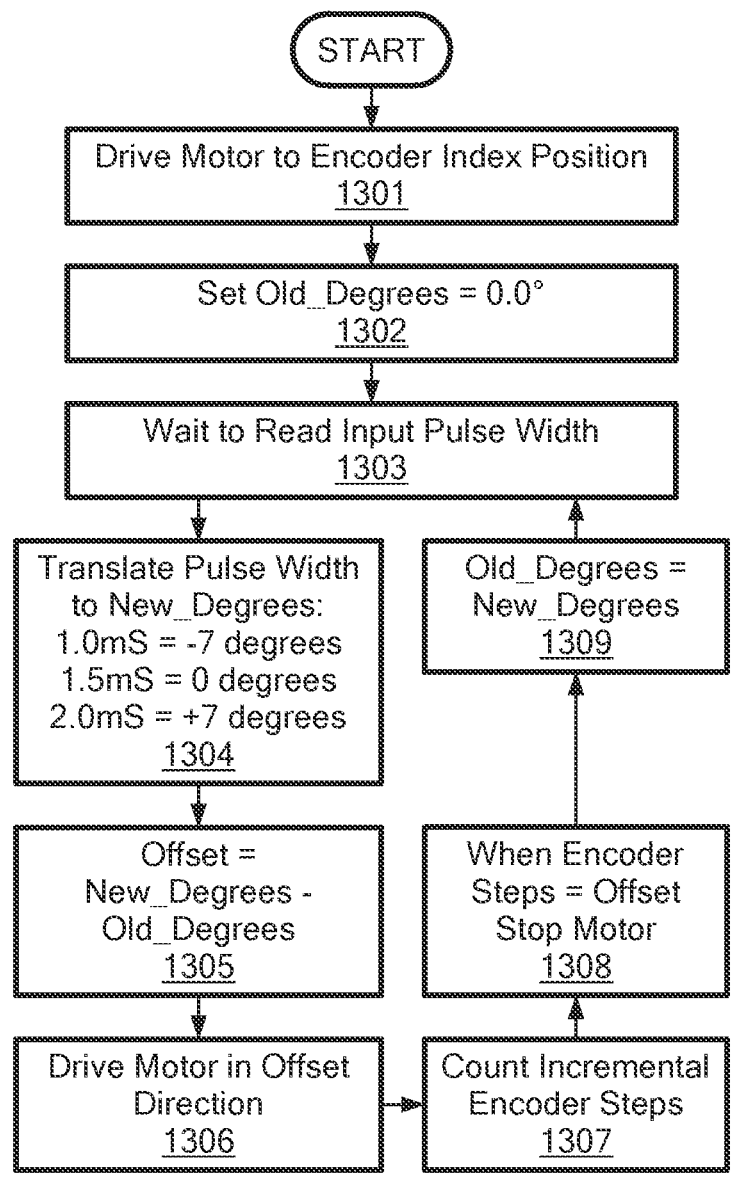
FIG. 13 is an exemplary cyclic motor control computer software flow diagram, in accordance with an embodiment of the present invention.

FIG. 13 is an exemplary cyclic motor control computer software flow diagram in accordance with an embodiment of the present invention. Considering the embodiment of the limited functionality cyclic motor control computer, commanded every 10 mS with PWM signaling described by FIG. 11, one embodiment of the software flow on the cyclic motor control computer 305 is illustrated in FIG. 13. Upon initialization of power, in process 1301, the cyclic motor control computer 305 (shown in FIG. 10) moves the cyclic motor 302 until finding the index position, with feedback from the encoder 303. In process 1302, at the index position, the cyclic motor control computer 305 initializes the cyclic pitch setting to zero degrees. In process 1303, from the initial neutral cyclic position, the cyclic motor control computer 305 awaits a PWM signal from the flight control computer 310. Once the pulse is received, process 1304 translates the pulse width to the desired cyclic angle. Process 1305 computes the difference in the newly commanded position from the old position, creating a required offset value. For the initial pass through the process loop, operating on cyclic control computer 305, the update value is simply the commanded position, since the cyclic has been initialized to the index position at zero degrees. In subsequent passes around the loop, the offset values will be a small number or fraction of a degree. For an exemplary embodiment with a stepper motor directly driving the cyclic shaft, the offset value may be a half step (0.9 degrees), full step (1.8 degrees), or perhaps no change at all. In process 1306, the cyclic motor control computer 305 drives the motor 302 toward the desired angle. Process 1307 monitors the incrementing of the encoder 303, as confirmation of the angular position. In Process 1308, once the commanded position is reached, the cyclic control computer 305 causes the cyclic motor 302 to stop. Finally, in process 1309, the software updates the position state, and returns to process 1303, awaiting the next PWM signal.

Figure 14A:
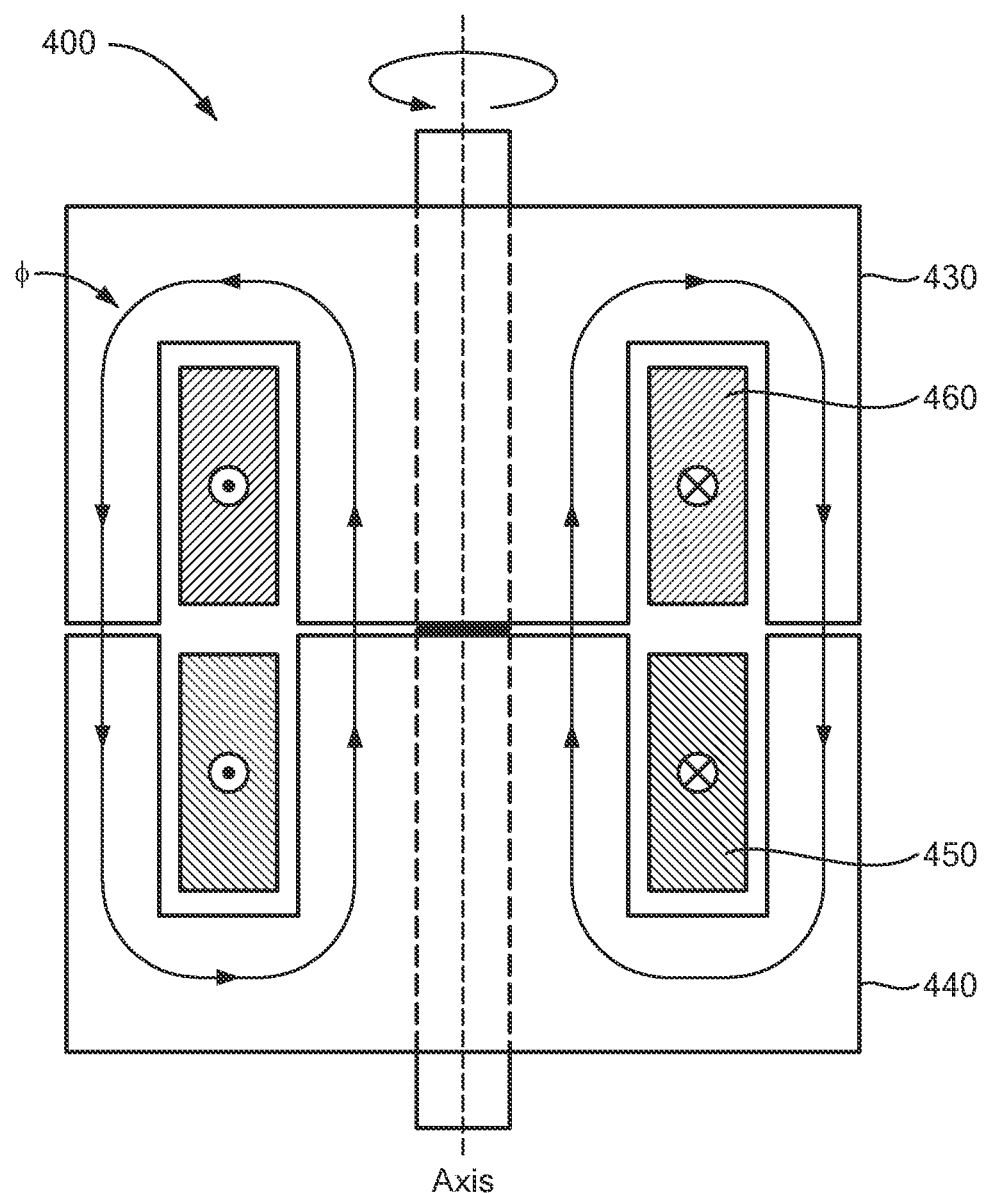
FIG. 14A is an exemplary cross-sectional view of a rotary transformer, in accordance with an embodiment of the present invention.

FIG. 14A is an exemplary cross-sectional view of a rotary transformer 400 in accordance with an embodiment of the present invention. In some embodiments of the novel cyclic control system, a single-phase stator-side winding 450 of the transformer 400 (shown in FIG. 14B) conveys power and signals to a single-phase rotor-side winding 460. Being in the stationary frame, the stator-side winding 450 conveys communications from the flight control computer within the aircraft fuselage, along with power presented as an alternating current. The proximity of the ferrite core 440 on the stator side and ferrite core 430 on the rotor side provides a low-loss magnetic coupling between the two halves of the transformer, even though the rotor-side ferrite 430 and winding 460 may be spinning at a high angular velocity relative to the stator-side ferrite 440 and winding 450. Thus, power and signals are conveyed with minimal loss to the rotating frame, which contains the cyclic motor control computer 305, motor driver 304, and cyclic motor.

Figure 14B:
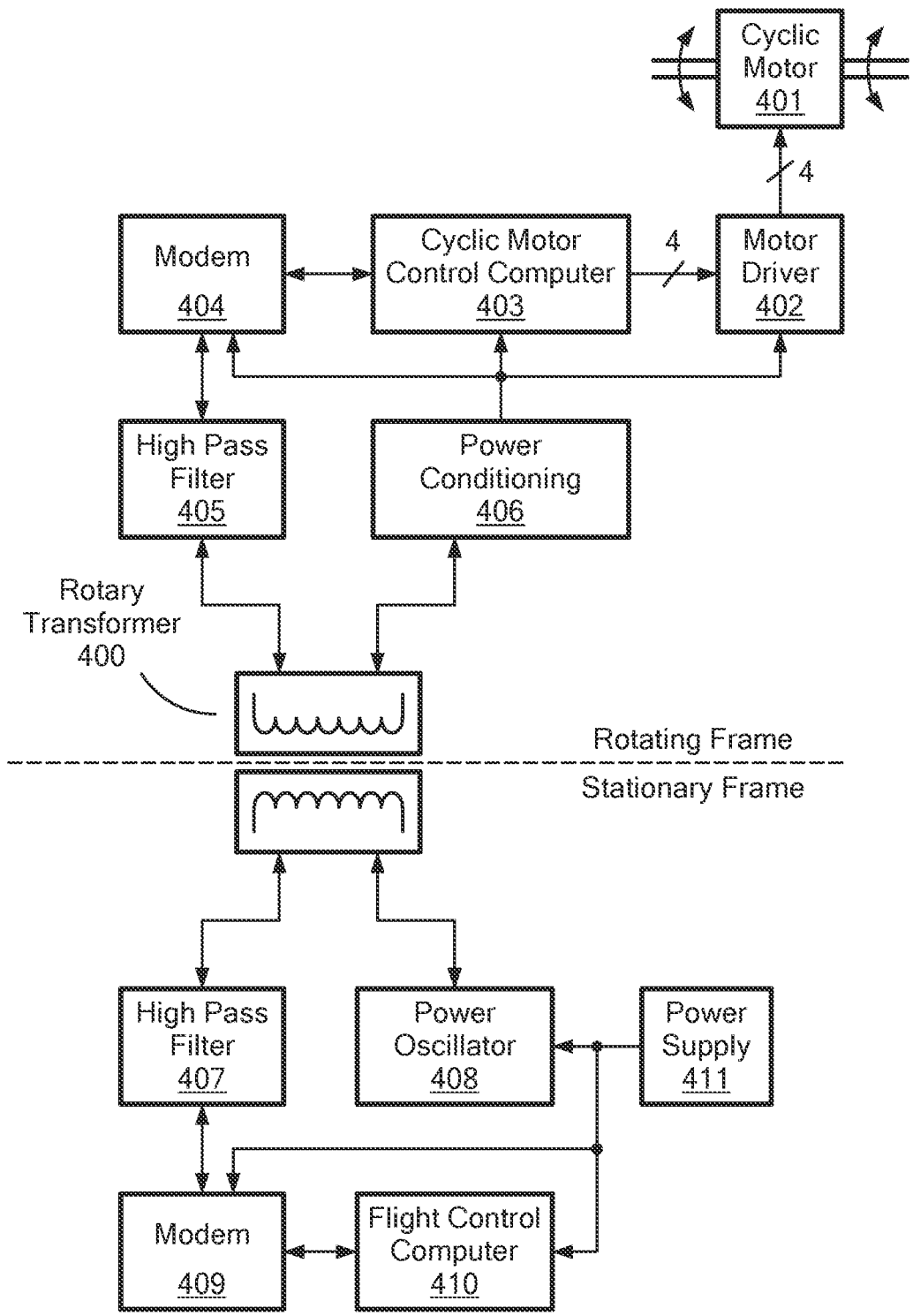
FIG. 14B is an exemplary electrical block diagram to utilize a rotary transformer for the cyclic control system, in accordance with an embodiment of the present invention.

FIG. 14B is a simplified electrical block diagram with various components, for an embodiment of the novel cyclic control system which utilizes a rotary transformer to convey signals between the stationary frame and rotating frame. In this exemplary embodiment, the flight control computer 410 is within the stationary frame, while the cyclic motor control computer 403 is within the rotating frame. The rotary transformer 400 is of the type described in the preceding paragraph, whereby both power and signal are conveyed through a single-phase winding. The sharing of the winding occurs through frequency-division multiplexing. Power oscillator 408 receives DC power from power supply 411, converting it to a power sinusoid at a low frequency, for example 400 Hz. Communication from the flight control computer 410, to the cyclic motor control computer 403, occurs through a pair of modems, shown as 409 on the stationary frame, and 404 on the rotating frame. These modems convey digital communications between the two computers 410 and 403, by modulating and demodulating a carrier at a high frequency, for example 13.56 MHz. To avoid the high voltage multiplexed power signal from damaging the modems 404 and 409, high-pass filters 405 and 407 are inserted between the modems 404 and 409, and the rotary transformer 400. Within the rotating frame, power conditioning 406 converts the AC power signal back to a DC supply, which then powers the modem 404, cyclic motor control computer 403, and motor driver 402. In this embodiment, the cyclic motor 401 is of the hybrid stepper motor type, with two windings connected to the motor driver 402.

As the mechanical design of the cyclic control system has been illustrated in two distinct embodiments, first in FIG. 5A through FIG. 5E, and second in FIG. 6A through FIG. 6E, the rotor blades are rigidly connected to a common shaft, articulated about the pitch angle axis. For modest scale rotorcraft, such as those operated remotely as drones, the rigid connection of the rotor blades is a simple and cost-effective embodiment. With increasing scale however, the offset lift and centripetal forces within the rotor system become significant, requiring a more careful consideration of rotor hub mechanical stress.

From the early days of rotorcraft development, it was recognized that allowing the rotor blades to naturally articulate in the two other axes of rotation reduces the forces acting upon the rotor hub. For "fully articulated" rotor systems, two hinges are introduced for each rotor blade. One of these hinges allows the blades to "flap," that is, to move up and down. The moving up and down naturally occurs to compensate for the dissymmetry of lift in the rotor during forward flight. Often, the flapping motion is mechanically cross-coupled into a moderation of blade incidence, essentially creating a negative feedback. For example, a blade with upward flapping will have its blade incidence reduced, while a blade with downward flapping will have its blade incidence increased. This cross-coupling is known as "Delta-3," a terminology so named in the early days of rotorcraft development. Delta-3 is frequently employed within two-bladed rotor systems, particularly for single-rotor helicopters. In some embodiments of the novel cyclic control system, Delta-3 coupling is combined with the cyclic motor articulation, moderating the amount of cyclic required in forward flight.

The second hinge, having an axis disposed orthogonally to the axis of the first hinge, is called a "lead-lag" hinge, which allows the blade to advance or retreat in its orbital motion. When the rotor blade flaps up, the speed of the blade increases. When the rotor blade flaps down, the speed of the blade decreases. The variation of blade speed with up and down position is known as the Coriolis effect, a case of the conservation of angular momentum. Early rotorcraft utilized flapping and lead-lag hinges with roller bearings, though adding dampers to limit the range of motion. More recent designs replace the roller bearings with elastomeric bearings, which allow some degree of rotation, though limited by the spring action of the elastomer. A third approach is the introduction of "flexures" in the rotor hub design, allowing the blades to have limited motion about the flapping and lead-lag axes. Larger scale embodiments of the cyclic control system are envisioned to use any of these three methods to reduce rotor hub mechanical stress.

What is claimed is:

1. An improved electrically powered rotorcraft, of the type having a rotor including a rotor hub and a pair of rotor blades mounted to the rotor hub on opposite sides thereof, the rotor being rotatably mounted on a primary drive shaft and configured to perform a 360 degree sweep, and a rotary electric motor coupled to the primary drive shaft, wherein the improvement comprises:
   a common pitch-angle shaft extending between each of the blades such that angular adjustment of the common pitch-angle shaft causes a corresponding angular adjustment of each of the blades;
   a limited-angle electric motor, mechanically coupled to the common pitch-angle shaft, and configured to cause angular adjustment of the common pitch angle shaft and therefore adjustment of pitch of the rotor blades; and
   a controller system in communication with the limited-angle electric motor, configured to provide cyclic pitch control of the pair of rotor blades via the common pitch-angle shaft.

2. The improved electrically powered rotorcraft of claim 1, wherein the improvement further comprises:
   a drive shaft rotary encoder, coupled to the primary drive shaft, having an output indicative of the angular position of the rotor over the 360-degree sweep, the output coupled to the controller system to inform the controller system of the current position of the rotor in the course of the 360-degree sweep.

3. The improved electrically powered rotorcraft of claim 1, wherein the improvement further comprises:
   a cyclic pitch rotary encoder, coupled to the common pitch-angle shaft, having an output indicative of a common pitch angle of the pair of rotor blades, the output coupled to the controller system to inform the controller system of a current common pitch angle of the pair of rotor blades.

4. The improved electrically powered rotorcraft of claim 3, wherein the improvement further comprises configuration of the cyclic pitch rotary encoder and the controller system to provide angular positioning of the common pitch angle of the pair of rotor blades.

5. The improved electrically powered rotorcraft of claim 2, wherein the improvement further comprises configuration of the cyclic pitch rotary encoder and the controller system to provide incremental angular positioning of the common pitch angle of the pair of rotor blades.

6. The improved electrically powered rotorcraft of claim 2, wherein the improvement further comprises a set of physical stops configured to limit rotation of the common pitch angle shaft to a specified range.

7. The improved electrically powered rotorcraft of claim 2, wherein the improvement further comprises redundant instances, for purposes of increased reliability, of a member selected from the group consisting of the rotary electric motor, the limited-angle electric motor, the controller system, the rotary encoder, and combinations thereof.

8. The improved electrically powered rotorcraft of claim 1, wherein the limited-angle electric motor is a stepper motor.

9. The improved electrically powered rotorcraft of claim 1, wherein the improvement further comprises a gear reduction mechanism disposed between the limited-angle electric motor and the common pitch-angle shaft.

10. The improved electrically powered rotorcraft of claim 1, wherein the improvement further comprises a first actuator arm coupled to the common pitch-angle shaft and a mechanical linkage disposed between the first actuator arm and a second actuator arm coupled to an output shaft of the limited-angle electric motor.

11. The improved electrically powered rotorcraft of claim 1, wherein the improvement further comprises a gear reduction mechanism disposed between the rotary electric motor and the primary drive shaft.

12. The improved electrically powered rotorcraft of claim 1, wherein the rotorcraft has a stationary frame and a rotating frame, and the improvement further comprises a rotary transformer to convey power and signals from the stationary frame to the rotating frame.

13. The improved electrically powered rotorcraft of claim 1, wherein the rotorcraft has a stationary frame and a rotating frame, and the improvement further comprises a sleeve coupling to convey power and signals from the stationary frame to the rotating frame.

14. The improved electrically powered rotorcraft of claim 1, wherein each rotor blade has a root, and the improvement further comprises a set of flapping and lead-lag hinges placed between the common pitch-angle shaft and the root of each rotor blade.

15. The improved electrically powered rotorcraft of claim 1, wherein the improvement further comprises a flexible joint, between the common pitch-angle shaft and each rotor blade, configured to allow limited flapping and lead-lag motion of each rotor blade.

16. The improved electrically powered rotorcraft of claim 1, wherein the improvement further comprises a set of hinges configured to allow each rotor blade to flap and a mechanical Delta-3 coupling of each rotor blade to the common pitch-angle shaft so that Delta-3 mechanically combines with the limited-angle electric motor to offset blade pitch.

17. An electrically powered rotorcraft, comprising:
 a rotor including a rotor hub and a pair of rotor blades mounted to the rotor hub on opposite sides thereof, the rotor being rotatably mounted on a primary drive shaft;
 a rotary electric motor coupled to the primary drive shaft;
 a common pitch-angle shaft extending between each of the rotor blades, rotatably mounted on the rotor hub, and coupled to each of the blades;
 a limited-angle electric motor, mechanically coupled to the common pitch-angle shaft, and configured to cause angular adjustment of the common pitch angle shaft and therefore adjustment of pitch of the rotor blades; and
 a controller system in communication with the limited-angle electric motor, configured to provide cyclic pitch control of the pair of rotor blades via the common pitch-angle shaft.

* * * * *